(12) United States Patent
Suzuki et al.

(10) Patent No.: US 11,523,075 B2
(45) Date of Patent: Dec. 6, 2022

(54) IMAGING DEVICE, IMAGING SYSTEM, AND METHOD OF DRIVING IMAGING DEVICE

(71) Applicant: CANON KABUSHIKI KAISHA, Tokyo (JP)

(72) Inventors: Atsushi Suzuki, Kanagawa (JP); Takanori Yamashita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/504,028

(22) Filed: Oct. 18, 2021

(65) Prior Publication Data

US 2022/0132055 A1 Apr. 28, 2022

(30) Foreign Application Priority Data

Oct. 23, 2020 (JP) .............................. JP2020-178125

(51) Int. Cl.
*H04N 5/359* (2011.01)
*H04N 5/378* (2011.01)

(52) U.S. Cl.
CPC ............. *H04N 5/359* (2013.01); *H04N 5/378* (2013.01)

(58) Field of Classification Search
CPC .... H04N 5/378; H04N 5/347; H04N 5/35581; H04N 5/359; H04N 5/3692; H04N 5/376
See application file for complete search history.

(56) References Cited

U.S. PATENT DOCUMENTS

| | | | |
|---|---|---|---|
| 7,903,056 B2 | 3/2011 | Kawasaki | |
| 9,502,451 B2 | 11/2016 | Yamashita | |
| 9,653,498 B2 | 5/2017 | Yamashita | |
| 9,699,395 B1 * | 7/2017 | Boemler | H04N 5/3575 |
| 9,749,570 B2 | 8/2017 | Yamashita | |
| 10,051,223 B2 | 8/2018 | Yamashita | |
| 10,057,529 B2 | 8/2018 | Saito | |
| 10,778,920 B2 | 9/2020 | Yamashita | |
| 11,070,753 B2 | 7/2021 | Yamashita | |
| 11,082,642 B2 | 8/2021 | Fukuhara | |

(Continued)

FOREIGN PATENT DOCUMENTS

| JP | H10-164442 A | 6/1998 |
|---|---|---|
| JP | 2001-045378 A | 2/2001 |

(Continued)

*Primary Examiner* — Chiawei Chen
(74) *Attorney, Agent, or Firm* — Venable LLP

(57) ABSTRACT

The imaging device includes a pixel including a photoelectric converter, an output line, a readout circuit unit connected to the output line, and a control unit. The readout circuit unit includes an amplifier circuit, a first switch for resetting the amplifier circuit, a sample-and-hold circuit, a second switch provided between the amplifier circuit and the sample-and-hold circuit, and a gain switching circuit. The control unit performs a first period of resetting the amplifier circuit by first switch, and a second period of connecting the amplifier circuit and the sample-and-hold circuit by the second switch. The first and second periods at least partially overlap with each other, and a timing at which the second switch transitions from an on state to an off state in the second period is later than a timing at which the first switch transitions from an on state to an off state in the first period.

18 Claims, 14 Drawing Sheets

(56) References Cited

U.S. PATENT DOCUMENTS

| | | | |
|---|---|---|---|
| 2005/0195645 A1* | 9/2005 | Panicacci | H04N 5/378 |
| | | | 348/E5.079 |
| 2012/0120292 A1* | 5/2012 | Centen | H04N 5/378 |
| | | | 348/300 |
| 2015/0172581 A1 | 6/2015 | Itano et al. | |
| 2015/0256783 A1* | 9/2015 | Yamashita | H04N 5/378 |
| | | | 250/208.1 |
| 2018/0152654 A1* | 5/2018 | Shimamura | H04N 5/378 |
| 2019/0379850 A1 | 12/2019 | Shinohara | |
| 2020/0260034 A1* | 8/2020 | Moue | H01L 27/14603 |
| 2020/0374481 A1 | 11/2020 | Yamashita | |
| 2021/0250532 A1 | 8/2021 | Akiyama | |
| 2021/0377480 A1 | 12/2021 | Yamashita | |

FOREIGN PATENT DOCUMENTS

| | | |
|---|---|---|
| JP | 2010-273383 A | 12/2010 |
| JP | 2015-119340 A | 6/2015 |
| JP | 2017-079464 A | 4/2017 |

\* cited by examiner

IMAGING DEVICE, IMAGING SYSTEM, AND METHOD OF DRIVING IMAGING DEVICE

BACKGROUND OF THE INVENTION

Field of the Invention

The present disclosure relates to an imaging device, an imaging system, and a method of driving the imaging device.

Description of the Related Art

As a technique for achieving both a wide dynamic range and high readout speed in an imaging device, a method of switching the gain of an amplifier circuit for each pixel according to an amount of incident light has been proposed. Japanese Patent Application Laid-Open No. 2017-079464 describes a method of correcting a level difference in luminance occurring near a boundary at which a gain of an amplifier circuit is switched. Japanese Patent Application Laid-Open No. 2001-045378 describes a technique for increasing a readout speed by using a sample-and-hold circuit.

However, when a sample-and-hold circuit is applied to an imaging device that switches the gain of the amplifier circuit for each pixel in accordance with the amount of incident light, an error may occur when a signal of a pixel reset level is read out. As a result, the level difference of the luminance occurring near the boundary at which the gain of the amplifier circuit is switched cannot be appropriately corrected, and the image quality may deteriorate.

SUMMARY OF THE INVENTION

An object of the present invention is to provide a technique for acquiring a high-quality image without decreasing a readout speed in an imaging device that switches a gain of an amplifier circuit for each pixel in accordance with an amount of incident light.

According to an aspect of the present invention, there is provided an imaging device including a pixel including a photoelectric converter and outputting a pixel signal based on an amount of charge generated by the photoelectric converter, an output line that the pixel signal is to be output from the pixel, a readout circuit unit connected to the output line, and a control unit configured to control the pixel and the readout circuit unit, wherein the readout circuit unit includes an amplifier circuit, a first switch configured to reset the amplifier circuit, a sample-and-hold circuit, a second switch provided between the amplifier circuit and the sample-and-hold circuit, and a gain switching circuit configured to switch a gain of the amplifier circuit according to a level of the pixel signal, wherein the control unit is configured to perform a first period of resetting the amplifier circuit by turning on the first switch, and a second period of connecting the amplifier circuit and the sample-and-hold circuit by turning on the second switch, and wherein the first period and the second period at least partially overlap with each other, and a timing at which the second switch transitions from an on state to an off state in the second period is later than a timing at which the first switch transitions from an on state to an off state in the first period.

According to another aspect of the present invention, there is provided a method of driving an imaging device including a pixel including a photoelectric converter and outputting a pixel signal based on an amount of charge generated by the photoelectric converter, an output line that the pixel signal is to be output from the pixel, and a readout circuit unit connected to the output line, wherein the readout circuit unit includes an amplifier circuit, a first switch configured to reset the amplifier circuit, a sample-and-hold circuit, a second switch provided between the amplifier circuit and the sample-and-hold circuit, and a gain switching circuit configured to switch a gain of the amplifier circuit according to a level of the pixel signal, the method including performing a first period of resetting the amplifier circuit by turning on the first switch, and performing a second period of connecting the amplifier circuit and the sample-and-hold circuit by turning on the second switch, wherein the first period and the second period at least partially overlap with each other, and a timing at which the second switch transitions from an on state to an off state in the second period is later than a timing at which the first switch transitions from an on state to an off state in the first period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
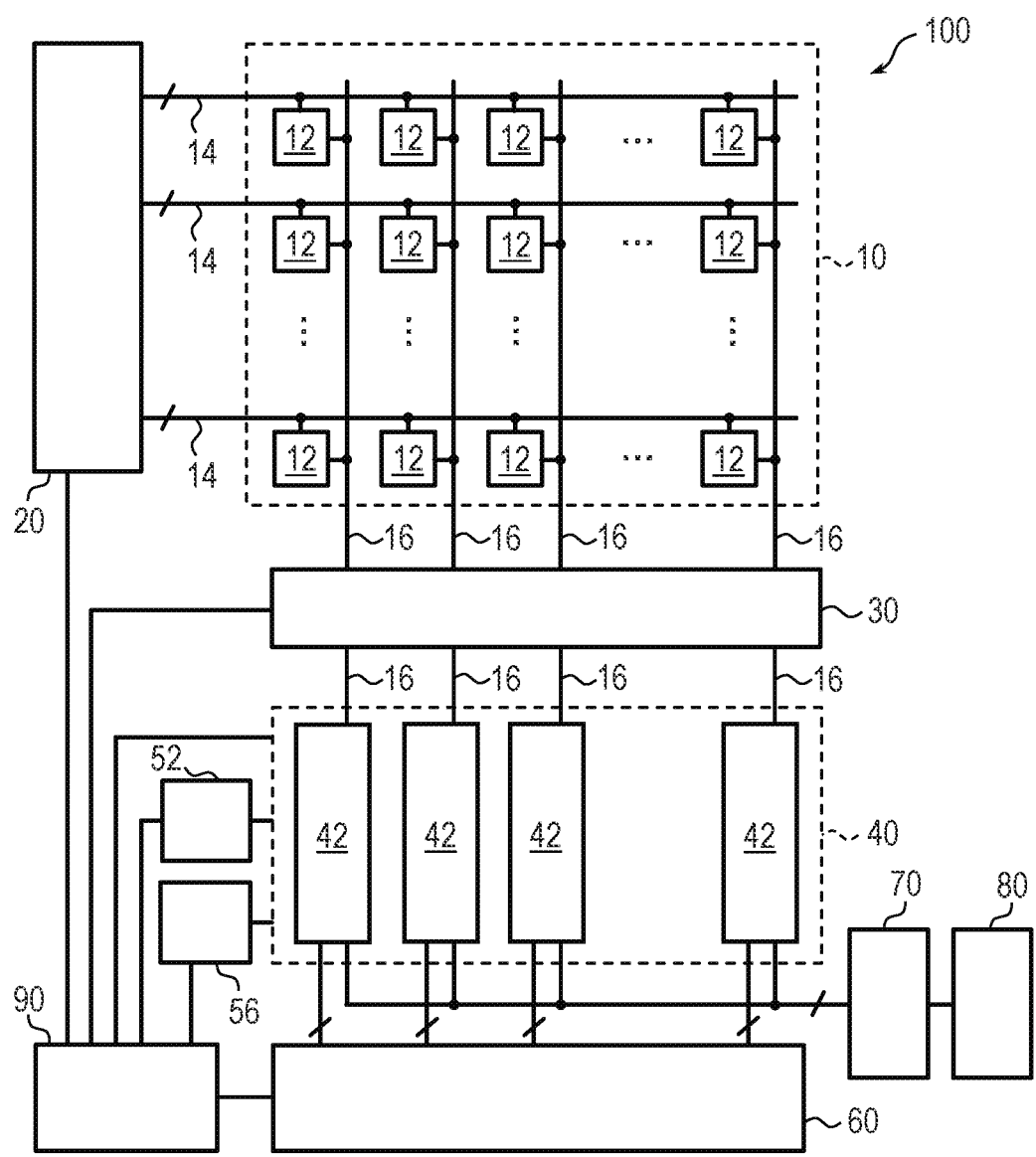
FIG. 1 is a block diagram illustrating a configuration example of an imaging device according to a first embodiment of the present invention.
Figure 2:
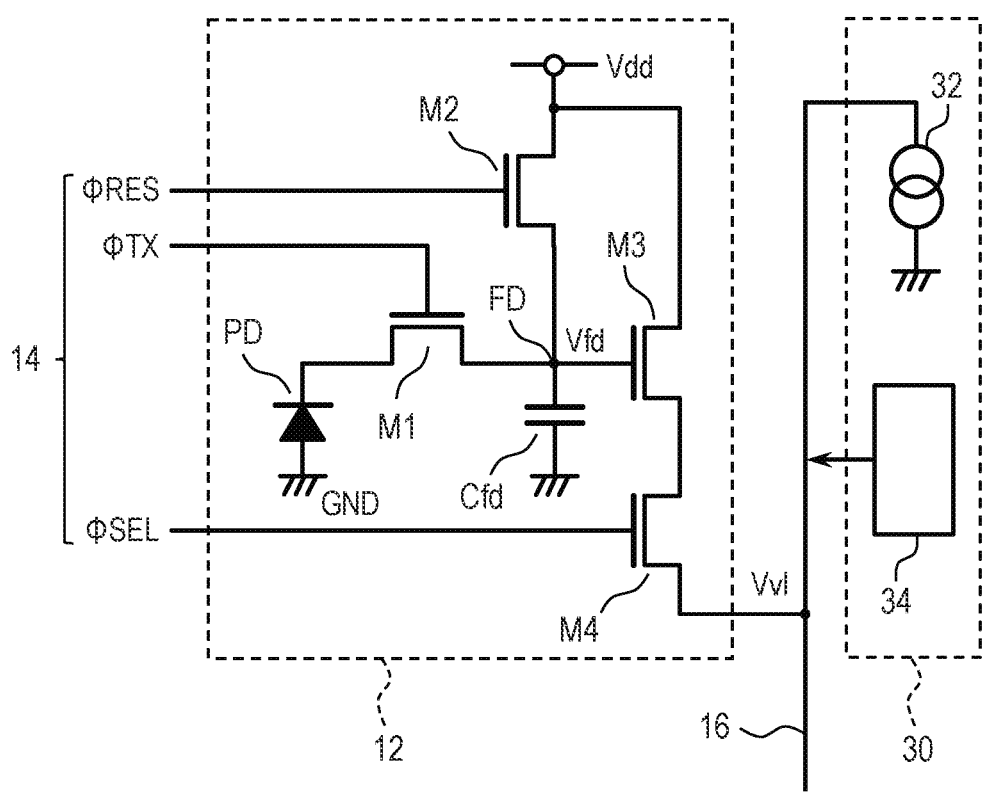
FIG. 2 is a circuit diagram illustrating a configuration example of a pixel and an output line control unit in the imaging device according to the first embodiment of the present invention.
Figure 3:
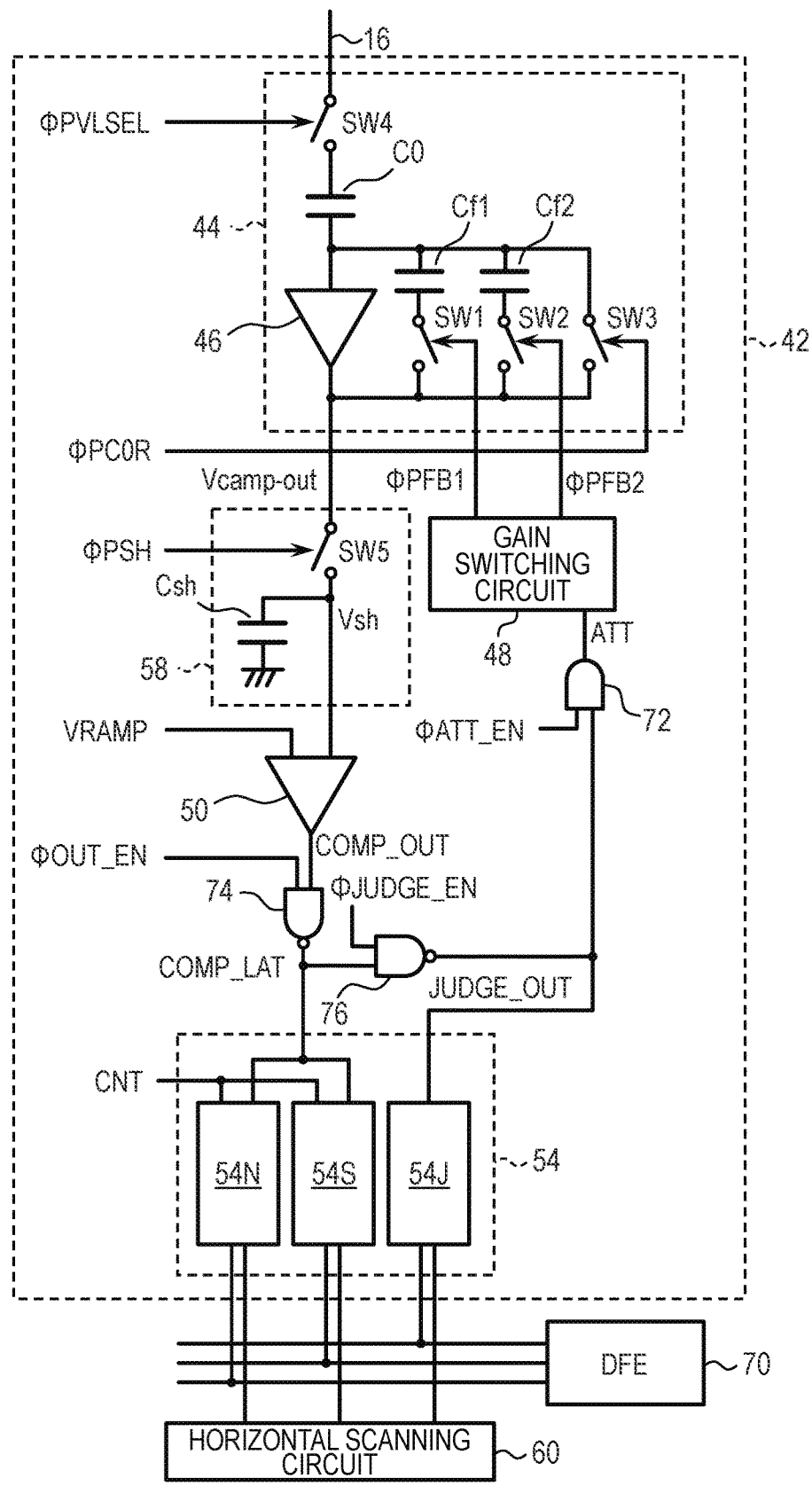
FIG. 3 is a circuit diagram illustrating a configuration example of a column circuit in the imaging device according to the first embodiment of the present invention.
Figure 4:
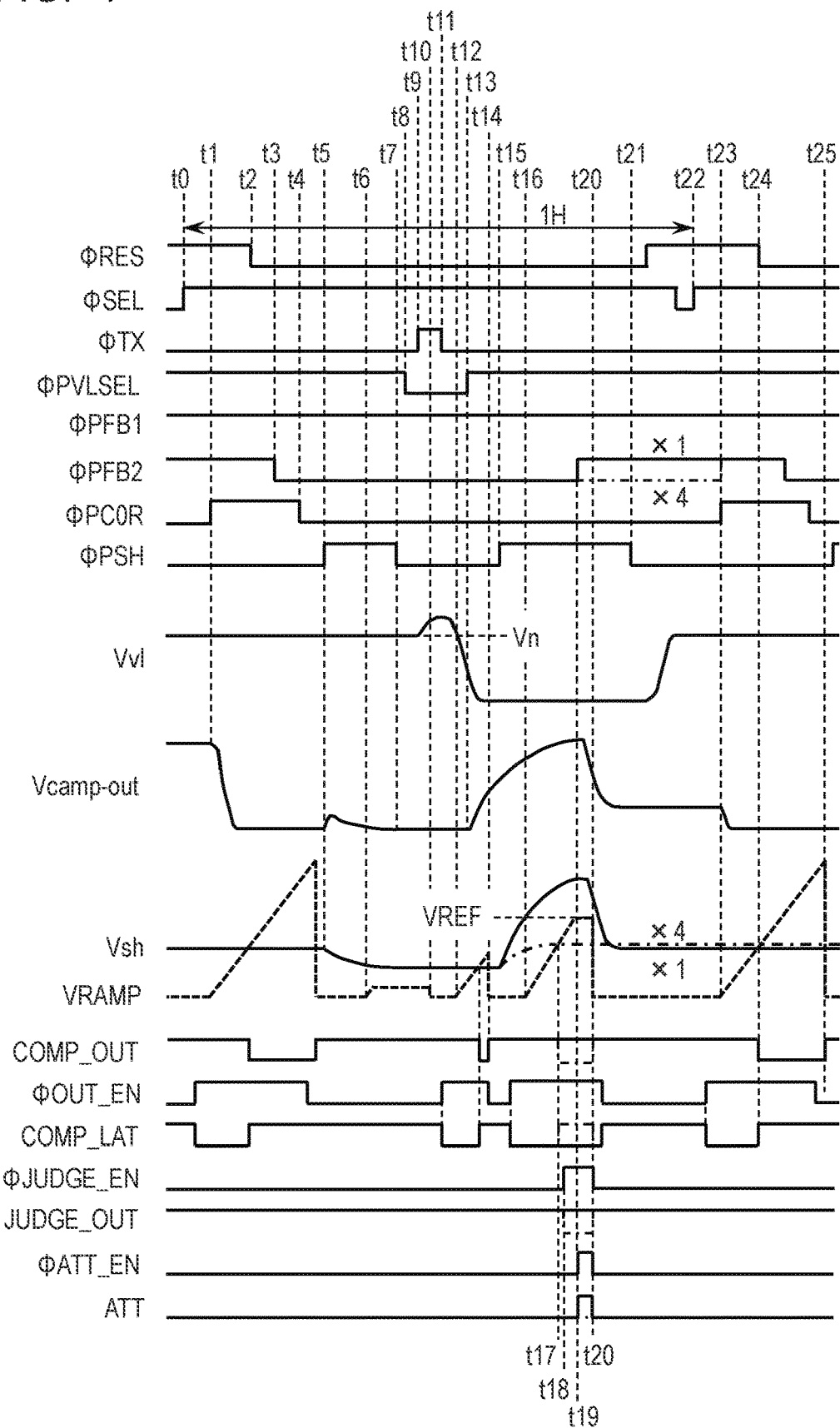
FIG. 4 and FIG. 7 are timing charts illustrating a method of driving the imaging device according to the first embodiment of the present invention.
Figure 5:
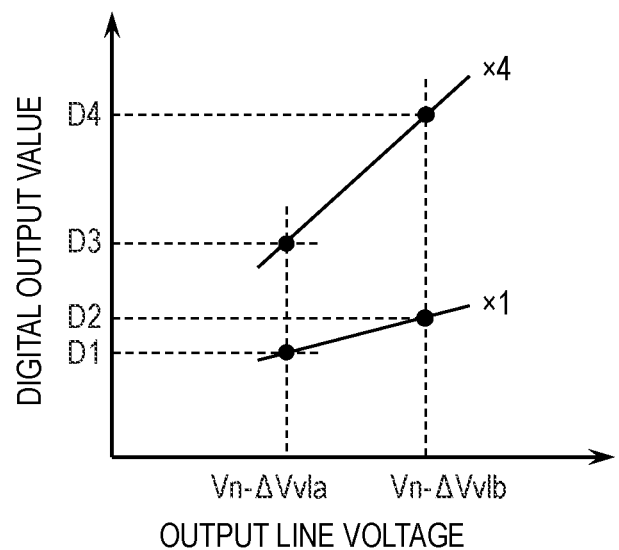
FIG. 5 is a graph illustrating a method of correcting a pixel value in the imaging device according to the first embodiment of the present invention.
Figure 6:
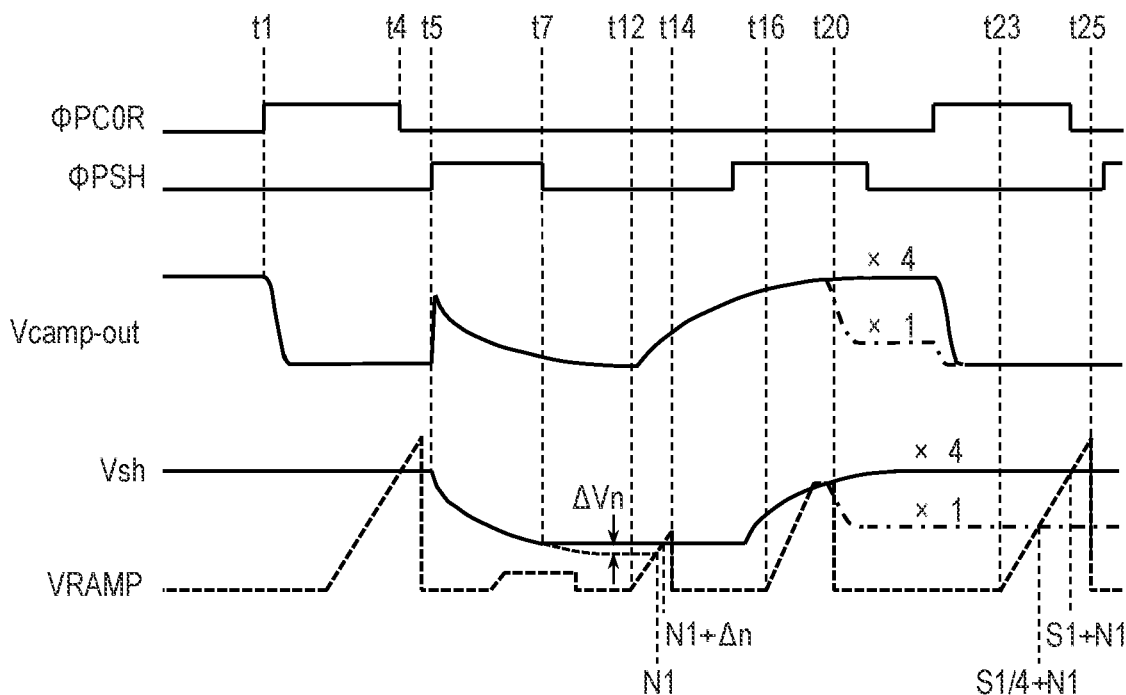
FIG. 6 is a timing chart illustrating a method of driving the imaging device according to the reference example.
Figure 7:
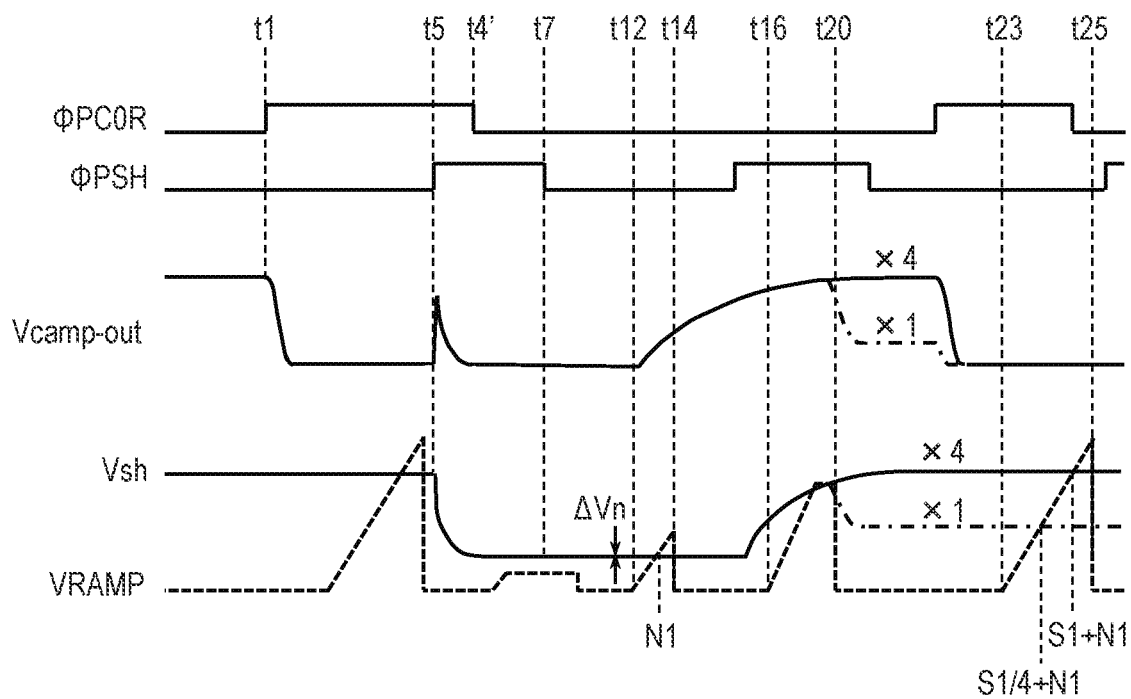

An imaging device and a method of driving the same according to a first embodiment of the present disclosure will be described with reference to FIG. 1 to FIG. 7. FIG. 1 is a block diagram illustrating a configuration example of an imaging device according to the present embodiment. FIG. 2 is a circuit diagram illustrating a configuration example of a pixel and an output line control unit in the imaging device according to the present embodiment. FIG. 3 is a circuit diagram illustrating a configuration example of a column circuit in the imaging device according to the present embodiment. FIG. 4 and FIG. 7 are timing charts illustrating a method of driving the imaging device according to the present embodiment. FIG. 5 is a graph illustrating a method of correcting a pixel value in the imaging device according to the present embodiment. FIG. 6 is a timing chart illustrating a method of driving the imaging device according to the reference example.

First, a general configuration of the imaging device according to the present embodiment will be described with reference to FIG. 1.

As illustrated in FIG. 1, the imaging device 100 according to the present embodiment includes a pixel array unit 10, a vertical scanning circuit 20, an output line control unit 30, a readout circuit unit 40, a reference signal generation unit 52, and a counter 56. The imaging device 100 further includes a horizontal scanning circuit 60, a signal processing unit 70, a signal output unit 80, and a control unit 90.

The pixel array unit 10 is provided with a plurality of pixels 12 arranged in matrix over a plurality of rows and a plurality of columns. FIG. 1 illustrates a part of the plurality of pixels 12 constituting the pixel array unit 10 for convenience. The number of pixels 12 constituting the pixel array unit 10 is not particularly limited. A specific configuration example of the pixel 12 will be described later.

In each row of the pixel array unit 10, a control line 14 is arranged so as to extend in a first direction (a lateral direction in FIG. 1). Each of the control lines 14 is connected to each of the pixels 12 arranged in the first direction, and forms a signal line common to these pixels 12. The first direction in which the control lines 14 extend may be referred to as a row direction or a horizontal direction. The control lines 14 are connected to the vertical scanning circuit 20.

In each column of the pixel array unit 10, an output line 16 is arranged so as to extend in a second direction (vertical direction in FIG. 1) intersecting the first direction. Each of the output lines 16 is connected to each of the pixels 12 arranged in the second direction, and forms a signal line common to these pixels 12. The second direction in which the output lines 16 extend may be referred to as a column direction or a vertical direction. Each of the output lines 16 is connected to an output line control unit 30 and a readout circuit unit 40.

The vertical scanning circuit 20 is a control circuit that supplies to the pixels 12 a control signal for driving the pixels 12 on a row-by-row basis via a control line 14 provided in each row of the pixel array unit 10. The vertical scanning circuit 20 may be configured using a shift register or an address decoder.

The output line control unit 30 is a control circuit unit that controls a bias current supplied to each of the output lines 16 and a voltage of each of the output lines 16.

The readout circuit unit 40 includes a plurality of column circuits 42 provided corresponding to the output lines 16 of each column. Each of the column circuits 42 is connected to the output line 16 of a corresponding column. Each of the column circuits 42 has a function of performing amplification processing and AD (analog-digital) conversion processing on the analog signal output from the pixel 12 of the corresponding column and holding the processed digital signal. A specific configuration example of the column circuit 42 will be described later.

The reference signal generation unit 52 is connected to the readout circuit unit 40. The reference signal generation unit 52 has a function of generating a reference signal for luminance determination and a reference signal for use in AD conversion, and supplying the reference signal to the readout circuit unit 40. The reference signal used for AD conversion may have a predetermined amplitude according to the range of the pixel signal, and the signal level may change with lapse of time. The reference signal is not particularly limited, but may be, for example, a ramp signal in which the signal level monotonically increases or monotonically decreases with lapse of time. The change in the signal level does not necessarily have to be continuous, and may be stepwise. The change in the signal level is not necessarily linear with respect to time, and may be curved with respect to time (e.g., sine wave or cosine wave).

The counter 56 is connected to the readout circuit unit 40. The counter 56 starts a counting operation in synchronization with a timing at which a change in the signal level of the reference signal supplied from the reference signal generation unit 52 starts, and outputs a count signal indicating the count value to the readout circuit unit 40.

The horizontal scanning circuit 60 is connected to the readout circuit unit 40. The horizontal scanning circuit 60 has a function of sequentially supplying to the column circuits 42 of the respective columns control signals for outputting digital signals stored in the column circuits 42 of the respective columns. The control lines of the horizontal scanning circuit 60 provided corresponding to the respective columns of the pixel array unit 10 are connected to the column circuits 42 of the corresponding columns. When the column circuit 42 of each column receives the control signal via the control line of the corresponding column of the horizontal scanning circuit 60, the column circuit 42 outputs the digital pixel signal held therein to the signal processing unit 70. The horizontal scanning circuit 60 has a function as a transfer unit that sequentially transfers the signals held in the column circuits 42 to a subsequent processing unit (signal processing unit 70) on a column-by-column basis.

The signal processing unit (DFE: Digital Front End) 70 is a circuit unit that performs predetermined signal processing on the digital signal output from the readout circuit unit 40. Examples of the processing executed by the signal processing unit 70 include amplification processing and digital correlation double sampling (CDS) processing. The digital CDS processing is a signal processing for performing a subtraction process of (S−N) on the noise signal N and the light signal S stored in the memory unit as digital pixel signals.

The signal output unit 80 is a circuit unit that outputs the signal processed by the signal processing unit 70 to the outside of the imaging device 100. The signal output unit 80 includes an external interface such as LVDS (Low Voltage Differential Signaling), and outputs the digital signal after signal processing to the outside of the imaging device 100.

The control unit 90 is a circuit unit that supplies control signals for controlling operations and timings of the vertical scanning circuit 20, the output line control unit 30, the readout circuit unit 40, the reference signal generation unit 52, the counter 56, and the horizontal scanning circuit 60. All of these control signals need not be supplied from the control unit 90, and at least a part of these control signals may be supplied from the outside of the imaging device 100.

Next, a configuration example of the pixel 12 and the output line control unit 30 in the imaging device 100 according to the present embodiment will be described with reference to FIG. 2.

Each of the pixels 12 may be the smallest unit of circuitry that is repeatedly arranged to construct an image. As illustrated in FIG. 2, each of the pixels 12 may include a photoelectric converter PD, a transfer transistor M1, a reset transistor M2, an amplifier transistor M3, and a select transistor M4. The transfer transistor M1, the reset transistor M2, the amplifier transistor M3, and the select transistor M4 may be n-channel MOS transistors, for example, but may be p-channel MOS transistors or other known switch elements.

The photoelectric converter PD may be, for example, a photodiode. The photodiode constituting the photoelectric converter PD has an anode connected to the ground node and a cathode connected to the source of the transfer transistor M1. The drain of the transfer transistor M1 is connected to the source of the reset transistor M2 and the gate of the amplifier transistor M3. A connection node of the drain of the transfer transistor M1, the source of the reset transistor M2, and the gate of the amplifier transistor M3 is a so-called floating diffusion FD. The floating diffusion FD includes a capacitance component (floating diffusion capacitor Cfd) and functions as a charge holding portion. The floating diffusion capacitor Cfd may include a p-n junction capacitor, an interconnection capacitor, and the like.

The drain of the reset transistor M2 and the drain of the amplifier transistor M3 are connected to a power supply node (voltage Vdd). The source of the amplifier transistor M3 is connected to the drain of the select transistor M4. The source of the select transistor M4 is connected to the output line 16.

In the case of the pixel configuration of FIG. 2, the control line 14 of each row arranged in the pixel array unit 10 includes three signal lines to which the control signals φRES, φTX, and φSEL from the vertical scanning circuit 20 are supplied. The signal line to which the control signal φRES is supplied is connected to the gates of the reset transistors M2 of the pixels 12 belonging to the corresponding row, and forms a common signal line for these pixels 12. The signal line to which the control signal φTX is supplied is connected to the gates of the transfer transistors M1 of the pixels 12 belonging to the corresponding row, and forms a common signal line for these pixels 12. The signal line to which the control signal φSEL is supplied is connected to the gates of the select transistors M4 of the pixels 12 belonging to the corresponding row, and forms a common signal line for these pixels 12. In a case that each transistor constituting the pixel 12 is formed of an n-channel transistor, when a control signal of High level (hereinafter referred to as "H level") is supplied from the vertical scanning circuit 20, the corresponding transistor is turned on (conductive state). When a control signal of Low level (hereinafter referred to as "L level") is supplied from the vertical scanning circuit 20, the corresponding transistor is turned off (non-conductive state).

The output line control unit 30 includes a current source 32 and a voltage supply circuit 34 corresponding to the output line 16 in each column. The current source 32 has a function of supplying a bias current to the pixel 12 via the output line 16. The voltage supply circuit 34 has a function of supplying a predetermined constant voltage to the output line 16 when acquiring a correction value for correcting the pixel signal. A method of correcting the pixel signal and acquiring the correction value will be described later.

The photoelectric converter PD converts (photoelectrically converts) the incident light into an amount of charge corresponding to the amount of light, and accumulates the generated charge. The transfer transistor M1 has a function as a transfer unit that transfers charge held by the photoelectric converter PD to the floating diffusion FD when the transfer transistor M1 is turned on. In this specification, the transfer transistor M1 may be referred to as a switch. The floating diffusion FD functions as a charge holding portion that holds charge transferred from the photoelectric converter PD, and becomes a voltage Vfd corresponding to the amount of charge transferred from the photoelectric converter PD by charge-voltage conversion by the floating diffusion capacitor Cfd. The amplifier transistor M3 has a configuration in which a power supply voltage is supplied to the drain thereof and a bias current is supplied to the source thereof from the current source 32 via the output line 16 and the select transistor M4, and constitutes an amplifier unit (source follower circuit) having the gate as an input node. The select transistor M4 is a switch for selecting the pixel 12, and is turned on to connect the amplifier transistor M3 to the output line 16. Thus, the amplifier transistor M3 outputs a signal corresponding to the voltage Vfd of the floating diffusion FD to the output line 16 via the select transistor M4. The amplifier transistor M3 and the select transistor M4 function as an output unit that outputs a pixel signal corresponding to the amount of charge held in the floating diffusion FD. When the reset transistor M2 is turned on, the floating diffusion FD is reset to a voltage corresponding to the power supply voltage.

As described above, the transfer transistor M1, the reset transistor M2, and the select transistor M4 of the pixel 12 are controlled in row units by the control signals φTX, φRES, and φSEL supplied from the vertical scanning circuit 20. The pixel signals of the pixels 12 belonging to the row selected by the control signal φSEL are simultaneously output to the corresponding output lines 16 of the respective pixels 12. The pixel signal output from each of the pixels 12 is an analog signal.

Next, a configuration example of the column circuit 42 in the imaging device 100 according to the present embodiment will be described with reference to FIG. 3.

Each of the column circuits 42 may include, for example, as illustrated in FIG. 3, an amplifier circuit 44, a gain switching circuit 48, a sample-and-hold circuit 58, a comparator 50, a column memory 54, and logic gates 72, 74, and 76.

The amplifier circuit 44 may include an amplifier 46, capacitors C0, Cf1, and Cf2, and switches SW1, SW2, SW3, and SW4. The amplifier 46 has at least one input node and at least one output node. The amplifier 46 may be a common source amplifier circuit or a differential input amplifier circuit. In the present embodiment, the amplifier circuit 44 constitutes an inverting amplifier circuit. The capacitor C0 is an input capacitor of the amplifier 46. The capacitors Cf1 and Cf2 are feedback capacitors of the amplifier 46. In this specification, similar reference numerals may be used to denote capacitance values of these capacitors.

One node of the switch SW4, which is also the input node of the amplifier circuit 44, is connected to the output line 16 of the corresponding column. The other node of the switch SW4 is connected to one electrode of the capacitor C0. The other electrode of the capacitor C0, one electrode of the capacitor Cf1, one electrode of the capacitor Cf2, and one node of the switch SW3 are connected to the input node of the amplifier 46. One node of the switch SW1 is connected to the other electrode of the capacitor Cf1. One node of the switch SW2 is connected to the other electrode of the capacitor Cf2. The other node of the switch SW1, the other node of the switch SW2, and the other node of the switch SW3 are connected to an output node of the amplifier 46 which is also an output node of the amplifier circuit 44.

The sample-and-hold circuit 58 may include a capacitor Csh and a switch SW5. The capacitor Csh is a sample-and-hold capacitor that temporarily holds the pixel signal amplified by the amplifier circuit 44. One node of the switch SW5 which is also the input node of the sample-and-hold circuit 58 is connected to the output node of the amplifier circuit 44 (the output node of the amplifier 46). The other node of the switch SW5 is connected to one electrode of the capacitor Csh. The other electrode of the capacitor Csh is connected to the ground node. A connection node between the other node of the switch SW5 and the one electrode of the capacitor Csh is also an output node of the sample-and-hold circuit 58.

The connection state of the switch SW1 is controlled by a control signal ϕPFB1 supplied from the gain switching circuit 48. The connection state of the switch SW2 is controlled by a control signal ϕPFB2 supplied from the gain switching circuit 48. The connection state of the switch SW3 is controlled by a control signal ϕPC0R supplied from the control unit 90. The connection state of the switch SW4 is controlled by a control signal ϕPVLSEL supplied from the control unit 90. The connection state of the switch SW5 is controlled by a control signal ϕPSH supplied from the control unit 90. In the present embodiment, it is assumed that the switches SW1, SW2, SW3, SW4, and SW5 are turned on (conductive state) when the corresponding control signal is at the H level, and turned off (nonconductive state) when the corresponding control signal is at the L level. However, the relationship between the level of the control signal and the state of the switch may be reversed.

The comparator 50 has two input nodes and one output node. One input node of the comparator 50 is connected to the output node of the sample-and-hold circuit 58 (the connection node between the other node of the switch SW5 and the one electrode of the capacitor Csh). The other input node of the comparator 50 is supplied with the reference signal VRAMP from the reference signal generation unit 52. The comparator 50 may function as a part of a determination circuit that determines the luminance of the pixel signal held by the capacitor Csh. The comparator 50 may function as a part of an analog-to-digital conversion circuit that performs an analog-to-digital conversion on the pixel signal held by the capacitor Csh.

The logic gates 72, 74, and 76 are logic circuits having two input nodes and one output node. Logic gate 72 may be, for example, a two-input AND gate. The logic gates 74 and 76 may be, for example, two-input NAND gates.

One input node of the logic gate 74 is connected to the output node of the comparator 50. A control signal ϕOUT_EN is supplied from the control unit 90 to the other input node of the logic gate 72. One input node of the logic gate 76 is connected to the output node of the logic gate 74. A control signal ϕJUDGE_EN is supplied from the control unit 90 to the other input node of the logic gate 76. One input node of the logic gate 72 is connected to the output node of the logic gate 76. A control signal ϕATT_EN is supplied from the control unit 90 to the other input node of the logic gate 72.

The column memory 54 may include an N-memory 54N, an S-memory 54S, and a J-memory 54J. Each of the N-memory 54N and the S-memory 54S has three input nodes and one output node. The J-memory 54J has two input nodes and one output node.

The first input node of the N-memory 54N and the first input node of the S-memory 54S are connected to the output node of the logic gate 74. The first input node of the J-memory 54J is connected to the output node of the logic gate 76. The second input node of the N-memory 54N, the second input node of the S-memory 54S, and the second input node of the J-memory 54J are connected to the horizontal scanning circuit 60. The counter 56 supplies the count signal CNT to the third input node of the N-memory 54N and the third input node of the S-memory 54S. The output node of the N-memory 54N, the output node of the S-memory 54S, and the output node of the J-memory 543 are connected to the signal processing unit 70. The count signal CNT and the pixel signals output from the N-memory 54N and the S-memory 54S are digital signals, and signal lines for transmitting these signals are constituted by a plurality of signal lines corresponding to the number of bits.

The gain switching circuit 48 has one input node and two output nodes. The input node of the gain switching circuit 48 is connected to the output node of the logic gate 72. One output node of the gain switching circuit 48 outputs a control signal ϕPFB1 to be supplied to the switch SW1. The other output node of the gain switching circuit 48 outputs a control signal ϕPFB2 to be supplied to the switch SW2.

The amplifier circuit 44 has a function of amplifying and outputting the analog pixel signal supplied from the output line 16. The input portion of the amplifier circuit 44 is provided with the switch SW4, and connection and disconnection between the output line 16 and the amplifier circuit 44 may be controlled in accordance with the control signal ϕPVLSEL.

When the switch SW1 is turned on, the input node and the output node of the amplifier 46 are connected via the capacitor Cf1. When the switch SW2 is turned on, the input node and the output node of the amplifier 46 are connected via the capacitor Cf2. That is, the capacitors Cf1 and Cf2 are feedback capacitors of the amplifier 46. As described above, the switches SW1 and SW2 are controlled by the control signals ϕPFB1 and ϕPFB2 supplied from the gain switching circuit 48. When the switch SW3 is turned on, the input node and the output node of the amplifier 46 are short-circuited, and the amplifier 46 and the capacitors C0, Cf1, and Cf2 are reset. As described above, the switch SW3 is controlled by the control signal ϕPC0R supplied from the control unit 90.

The gain of the amplifier circuit 44 is expressed by a ratio (CIN/CF) between the input capacitance CIN and the feedback capacitance CF. Here, the feedback capacitance CF becomes (Cf1+Cf2) when both the switches SW1 and SW2 are on, becomes Cf1 when the switch SW1 is on and the switch SW2 is off, and becomes Cf2 when the switch SW1 is off and the switch SW2 is on. That is, active feedback capacitors (capacitors Cf1 and Cf2) may be selected by controlling the switches SW1 and SW2 by the control signals ϕPFB1 and ϕPFB2. The input capacitance CIN corresponds to the capacitance of the capacitor C0.

The capacitance values of the capacitors C0, Cf1, and Cf2 may be suitably set in accordance with the gain required for the amplifier circuit 44. In the present embodiment, the capacitance value of the capacitor C0 is 4C, the capacitance value of the capacitor Cf1 is C, and the capacitance value of the capacitor Cf2 is 3C (C is an arbitrary constant). In this case, the gain of the amplifier circuit 44 becomes one time (C0/(Cf1+Cf2)=4C/(C+3C)=1) when both the switches SW1 and SW2 are on. The gain of the amplifier circuit 44 is four times (C0/(Cf1+Cf2)=4C/(C+0)=4) when the switch SW1 is on and the switch SW2 is off.

The sample-and-hold circuit 58 has a function of holding a signal Vcamp-out output from the amplifier circuit 44. A switch SW5 is provided at an input portion of the sample-and-hold circuit 58, and connection and disconnection between the amplifier circuit 44 and the sample-and-hold circuit 58 may be controlled in response to the control signal PSH. When the switch SW5 is turned on, the capacitor Csh is charged by the signal Vcamp-out output from the amplifier circuit 44, and a voltage Vsh corresponding to the signal Vcamp-out is held by the capacitor Csh. Thereafter, when the switch SW5 is turned off, the amplifier circuit 44 and the sample-and-hold circuit 58 are disconnected from each other, but the voltage Vsh held by the capacitor Csh is maintained as it is. Thus, the pixel 12 and the amplifier circuit 44 may start the readout operation of the next row in parallel while operating the circuits after the sample-and-hold circuit 58, and the readout operation of the imaging device may be speeded up.

The comparator 50 compares the level of the signal Vsh held by the capacitor Csh with the level of the reference signal VRAMP, and outputs a signal COMP_OUT corresponding to the comparison result. For example, the comparator 50 outputs the signal COMP_OUT of the H level when the level of the reference signal VRAMP is lower than the level of the signal Vsh. When the level of the reference signal VRAMP is higher than the level of the signal Vsh, the comparator 50 outputs the signal COMP_OUT of the L level. The relationship between the magnitude of the input signal and the level of the output signal may be reversed.

The logic gate 74 receives the signal COMP_OUT and the control signal φOUT_EN supplied from the control unit 90, and outputs a signal COMP_LAT. The control signal φOUT_EN is a permission signal for permitting the output of the signal COMP_OUT from the comparator 50. The logic gate 74 outputs a signal COMP_LAT of the L level when the signal COMP_OUT and the control signal φOUT_EN are at the H level, and outputs a signal COMP_LAT of the H level otherwise.

The logic gate 76 receives the signal COMP_LAT and the control signal φJUDGE_EN supplied from the control unit 90, and outputs a signal JUDGE_OUT. The control signal φJUDGE_EN is a determination permission signal for permitting determination processing for determining whether the analog pixel signal has a low luminance or a high luminance. The logic gate 76 outputs the signal JUDGE_OUT of the L level when the signal COMP_LAT and the control signal φJUDGE_EN are at the H level, and outputs the signal JUDGE_OUT of the H level otherwise.

The logic gate 72 receives the signal JUDGE_OUT and the control signal φATT_EN supplied from the control unit 90, and outputs the control signal ATT. The control signal ATT_EN is a permission signal for permitting switching of gain by the gain switching circuit 48. The logic gate 72 outputs the control signal ATT of the H level when the signal JUDGE_OUT and the control signal φATT_EN are at the H level, and outputs the control signal ATT of the L level otherwise.

The gain switching circuit 48 outputs the control signals φPFB1 and φPFB2 according to a control signal from the control unit 90. The gain switching circuit 48 may also output the control signals φPFB1 and φPFB2 corresponding to the level of the control signal ATT. In the present embodiment, the control signals φPFB1 and φPFB2 of the H level are output when the control signal ATT is at the H level, and the control signals φPFB1 and φPFB2 of the L level are output when the control signal ATT is at the L level.

The column memory 54 includes an N-memory 54N for storing a signal level of a reset state of the amplifier circuit 44, an S-memory 54S for storing a signal level corresponding to incident light, and a J-memory 54J for storing gain switching determination information, which will be described later. In the N-memory 54N and the S-memory 54S, the count value indicated by the count signal CNT output from the counter 56 at the timing when the level of the signal COMP_OUT is inverted is held as digital data (digital pixel signal) of the analog pixel signal. The J-memory 54J holds a signal corresponding to the level of the signal COMP_OUT as gain switching determination information. The digital data stored in the N-memory 54N, the S-memory 54S, and the J-memory 54J are sequentially transferred to the signal processing unit 70 for each column in response to a control signal supplied from the horizontal scanning circuit 60.

When the pixel signal is read out from the pixel array unit 10, first, the control signal φPC0R is controlled to the H level to turn on the switch SW3, and the initial reset of the amplifier circuit 44 is performed. Next, the control signal φPFB1 is controlled to the H level, the control signals φPFB2 and φPC0R are controlled to the L level to turn on the switch SW1 and to turn off the switches SW2 and SW3. In this state, a pixel signal (N-level signal) corresponding to the pixel signal reference voltage is output to the output line 16. As a result, the N-level signal is amplified at a gain of four times, and is output from the amplifier circuit 44.

Next, when a signal (S-level signal) corresponding to the amount of incident light is output from the pixel 12, the comparator 50 compares the pixel signal amplified by the amplifier circuit 44 with the reference signal VRAMP, and outputs a signal COMP_OUT as a determination latch signal between low luminance and high luminance. The logic gates 74, 76, and 72 supply the control signal ATT corresponding to the level of the signal COMP_OUT to the gain switching circuit 48.

As a result of comparison by the comparator 50, when it is determined that the pixel signal has a high luminance, the control signal φPFB2 is controlled to the H level by the gain switching circuit 48, and the switch SW2 is turned on, whereby the gain of the amplifier circuit 44 is switched from four times to one time. On the other hand, as a result of comparison by the comparator 50, when it is determined that the pixel signal has a low luminance, the control signal φPFB2 remains at the L level, the switch SW2 remains off, and the gain of the amplifier circuit 44 remains four times.

By driving the column circuit 42 in this manner, the gain of the amplifier circuit 44 at the time of reading out the S-level signal may be set to four times at the time of low luminance and to one time at the time of high luminance, and it is possible to achieve both high-speed readout and dynamic range without deteriorating the S/N characteristic.

Next, a method of driving the imaging device according to the present embodiment will be described more specifically with reference to FIG. 4 to FIG. 7.

FIG. 4 is a timing chart illustrating a pixel signal readout operation in an arbitrary row of the pixel array unit 10. Here, an example will be described in which the gain of the amplifier circuit 44 is set to four times, and the gain is switched to one time when the pixel signal is determined to have a high luminance.

FIG. 4 illustrates the levels of the control signals ϕRES, ϕSEL, ϕTX, ϕPVLSEL, ϕPFB1, ϕPFB2, ϕPC0R, ϕPSH and ATT. FIG. 4 also illustrates the voltage Vv1 of the output line 16, the voltage Vsh of the capacitor Csh, the signals Vcamp-out, COMP_OUT, and COMP_LAT, and the level of the reference signal VRAMP FIG. 4 also illustrates the levels of the control signals ϕOUT_EN, ϕJUDGE_EN, ϕJUDGE_OUT, and ϕATT_EN as various enable signals.

The time t0 is a timing at which a readout operation is started in an arbitrary row of the pixel array unit 10. In a period before the time t0, it is assumed that the control signal ϕRES of the corresponding row and the control signals ϕPVLSEL, ϕPFB1, and ϕPFB2 are at the H level, and the other control signals are at the L level. Note that a period from time t0 to time t22 corresponds to a period in which the pixel signals are read out from one row (one horizontal period (1H)).

At time t0, the vertical scanning circuit 20 controls the control signal ϕSEL of the row to be read out from the L level to the H level. Thus, the select transistors M4 of the pixels 12 belonging to the row are turned on, and the pixels 12 may output pixel signals to the output lines 16 of the corresponding columns.

At a subsequent time t1, the control unit 90 controls the control signal ϕPC0R from the L level to the H level, and turns on the switch SW3. At this time, the control signals ϕPFB1 and ϕPFB2 are at the H level, and the switches SW1 and SW2 are also turned on. Thereby, the capacitors C0, Cf1, and Cf2 of the amplifier circuit 44 are reset.

At a subsequent time t2, the vertical scanning circuit 20 controls the control signal ϕRES of the row to be read out from the H level to the L level. Thereby, the reset transistors M2 of the pixels 12 belonging to the row are turned off, and the reset states of the floating diffusions FD of the pixels 12 are released. Thus, the floating diffusion FD (floating diffusion capacitor Cfd) holds the pixel signal reference voltage including the noise component caused by the reset operation of the pixel 12. A pixel signal (N-level signal) corresponding to the pixel signal reference voltage of the floating diffusion FD is output to the output line 16.

At a subsequent time t3, the gain switching circuit 48 controls the control signal ϕPFB2 from the H level to the L level. Thereby, the switch SW2 of the amplifier circuit 44 is turned off, and the reset state of the capacitor Cf2 is released. Since the potential of the capacitor Cf2 on the switch SW2 side becomes unstable when the switch SW2 is turned off, the capacitor Cf2 is reset in a period until time t3 for each read row so that the potential decreases during the read operation and the switch SW2 is erroneously turned on and the gain is not changed.

At a subsequent time t4, the control unit 90 controls the control signal ϕPC0R from the H level to the L level. Thereby, the switch SW3 of the amplifier circuit 44 is turned off, and the reset state of the amplifier circuit 44 is released. At the same time, charges corresponding to the pixel signal reference voltage at the time of reset are held in the capacitor C0.

A period from time t5 to time t7 is a sampling period of the N-level signal output to the output line 16. During the period from time t5 to time t7, the control unit 90 controls the control signal ϕPSH from the L level to the H level. Thus, the switch SW5 is turned on, and the N-level signal amplified by the amplifier circuit 44 with a gain of four times is held by the capacitor Csh.

A period from time t6 to time t10 between time t5 and time t7 is the reset period of the comparator 50. Between time t6 and time t10, the reference signal generation unit 52 increases the reference signal VRAMP to the level of the offset voltage of the comparator 50 and resets the comparator 50. Thus, the voltage level obtained by decreasing the reset level of the comparator 50 by the offset voltage may be set as the initial state of the input node of the reference signal VRAMP. Since the linearity of the reference signal VRAMP at the time of rising is poor, the AD conversion process may be avoided from being performed at a position where the linearity of the reference signal VRAMP is poor by setting the offset, and the AD conversion accuracy may be improved.

The subsequent period from time t12 to time t14 is a period during which AD conversion is performed on the pixel signal of the N-level corresponding to the pixel signal reference voltage. The reference signal generation unit 52 starts increasing the signal level of the reference signal VRAMP from time t12. The comparator 50 compares the level of the voltage Vsh of the capacitor Csh with the level of the reference signal VRAMP, and inverts the signal COMP_OUT from the H level to the L level when the level of the reference signal VRAMP exceeds the level of the voltage Vsh. In the AD conversion period, the control signal ϕOUT_EN is at the H level, and the signal COMP_LAT output from the output node of the logic gate 76 is inverted from the L level to the H level at the timing when the signal COMP_OUT is inverted from the H level to the L level. A count signal CNT from which counting is started in synchronization with the start of the increase of the reference signal VRAMP at time t12 is input to the column memory 54 from the counter 56. The N-memory 54N stores the count value indicated by the count signal CNT at the timing when the signal COMP_LAT is inverted as a digital value obtained by AD conversion of the pixel signal of the N-level.

During the period from time t8 to time t13, the control unit 90 controls the control signal ϕPVLSEL from the H level to the L level, and turns off the switch SW4 of the amplifier circuit 44. Thus, the amplifier circuit 44 is disconnected from the output line 16, and noise generated by driving the pixel circuit when the pixel signal is read out is prevented from inputting to the amplifier circuit 44, thereby reducing variation in the output of the amplifier circuit 44.

During the period from time t9 to time t11, the vertical scanning circuit 20 controls the control signal ϕTX of the pixels 12 of the row to be read out from the L level to the H level. Thus, the transfer transistors M1 of the pixels 12 belonging to the row are turned on, and the charges accumulated in the photoelectric converters PD during the predetermined exposure period are transferred to the floating diffusions FD. The floating diffusion FD has a voltage corresponding to the amount of charge transferred from the photoelectric converter PD, and a pixel signal (S-level signal) corresponding to the voltage of the floating diffusion FD is output to the output line 16.

At this time, the floating diffusion FD is influenced by feedthrough due to capacitive coupling between the floating diffusion FD and the transfer signal line for supplying the control signal ϕTX, and temporarily rises from the pixel signal reference voltage at the time of reset. Accordingly, the voltage Vv1 of the output line 16 is higher than the voltage level corresponding to the pixel signal reference voltage. Therefore, if the control signal ϕPVLSEL is returned to the H level immediately after the time t11, the level of the signal Vcamp-out output from the amplifier circuit 44, which is the inverting amplifier circuit, temporarily drops due to the connection between the output line 16 and the amplifier circuit 44. As a result, when the pixel signal of the S-level is read out, the settling of the output until the luminance determination period described later becomes insufficient, and the luminance determination boundary level deviates from the assumed value. The correction value acquired by the method described later has a large correction error, and the level difference of the luminance generated in the vicinity of the boundary at which the gain is switched cannot be reduced.

From such a viewpoint, it is desirable that the timing (time t13) at which the control signal φPVLSEL is returned from the L level to the H level be set to the timing after the output unit of the pixel 12 is settled. The period until the output unit is settled is a period until the influence of feedthrough from the control signal φTX to the floating diffusion FD is relaxed. Alternatively, the period until the output portion is settled may be referred to as a period until the potential of the output line 16 becomes lower than the potential of the output line 16 before the charge is transferred to the floating diffusion FD. By setting the time t13 to such a timing, it is possible to prevent the level of the signal Vcamp-out from falling, and to reduce the level difference of the luminance occurring near the boundary at which the gain is switched.

At time t13, the control signal φPVLSEL becomes the H level and the switch SW4 is turned on, whereby the amplifier circuit 44 is connected to the output line 16, and the amplifying operation of the pixel signal (S-level signal) in the amplifier circuit 44 is started.

A period from time t15 to time t21 is a sampling period of the S-level signal output to the output line 16. During the period from time t15 to time t21, the control unit 90 controls the control signal φPSH from the L level to the H level. Thus, the switch SW5 is turned on, and the S-level signal amplified by the amplifier circuit 44 is held by the capacitor Csh.

The period from time t16 to time t20 is a determination period of the level of the pixel signal by the comparator 50, specifically, a luminance determination period for determining whether the pixel signal is a low luminance signal or a high luminance signal. The reference signal generation unit 52 starts increasing the signal level of the reference signal VRAMP at time t16, and maintains it until time t20 after the signal level reaches a predetermined reference voltage VREF. The reference voltage VREF is a threshold voltage serving as a reference for determining whether the pixel signal is a low-luminance signal or a high-luminance signal.

When the pixel signal of the S-level has a low luminance, the level of the reference signal VRAMP exceeds the level of the voltage Vsh at time 117, and the signal COMP_OUT transitions from the H level to the L level (the waveform in this case is indicated by a dashed line). In the luminance determination period, the control signal φOUT_EN is at the H level, and as the signal COMP_OUT transits from the H level to the L level, the signal COMP_LAT transits from the L level to the H level.

In the period from time t18 to time t20, the control signal φJUDGE_EN is controlled from the L level to the H level, whereby the signal JUDGE_OUT transitions from the H level to the L level. The signal JUDGE_OUT is input to the J-memory 54J, and "0" is stored as information indicating low luminance (J=0).

In a period from time t19 to time t20, the control signal φATT_EN is controlled from the L level to the H level. At this time, the signal JUDGE_OUT is at the L level, and the control signal ATT as the output of the logic gate 72 is maintained at the L level. Thus, the control signal φPFB1 output from the gain switching circuit 48 remains at the H level, the control signal φPFB2 remains at the L level, and the gain of the amplifier circuit 44 remains four times.

When the pixel signal of the S-level has a high luminance, the reference signal VRAMP does not exceed the level of the voltage Vsh even when the reference voltage VREF is reached, and the signal COMP_OUT remains at the H level (the waveform in this case is indicated by a solid line). In the luminance determination period, the control signal φOUT_EN is at the H level, and the signal COMP_LAT remains at the L level.

While the control signal φJUDGE_EN is controlled from the L level to the H level during the period from time t18 to time t20, the signal JUDGE_OUT remains the H level in response to the signal COMP_LAT of the L level. The signal JUDGE_OUT is input to the J-memory 54J, and "1" is stored as information indicating high luminance (J=1).

In a period from time t19 to time t20, the control signal φATT_EN is controlled from the L level to the H level. At this time, the signal JUDGE_OUT is at the H level, and the control signal ATT, which is the output of the logic gate 72, transitions from the L level to the H level. As a result, the control signal φPFB1 output from the gain switching circuit 48 becomes the H level and the control signal φPFB2 becomes the H level, and the gain of the amplifier circuit 44 is switched to 1. As a result, the level of the signal Vcamp-out decreases to ¼.

The subsequent period from time t23 to time t25 is a period during which AD conversion is performed on the pixel signal of the S-level. The reference signal generation unit 52 starts increasing the signal level of the reference signal VRAMP from time t23. The comparator 50 compares the level of the voltage Vsh of the capacitor Csh with the level of the reference signal VRAMP, and inverts the signal COMP_OUT from the H level to the L level when the level of the reference signal VRAMP exceeds the level of the voltage Vsh. In the AD conversion period, the control signal φOUT_EN is at the H level, and the signal COMP_LAT output from the output node of the logic gate 76 is inverted from the L level to the H level at the timing when the signal COMP_OUT is inverted from the H level to the L level. A count signal CNT from which counting is started in synchronization with the start of the increase of the reference signal VRAMP at time t23 is input to the column memory 54 from the counter 56. The S-memory 54S stores the count value indicated by the count signal CNT at the timing when the signal COMP_LAT is inverted as a digital value obtained by AD conversion of the pixel signal of the S-level.

Since the imaging device 100 of the present embodiment includes the sample-and-hold circuit 58, as described above, the period from time t23 to time t25 may be performed in parallel with the readout operation of the next row. Thus, the readout operation of the imaging device may be speeded up.

During the period after time t25, the digital data stored in the column memory 54 is transferred to the signal processing unit 70 in column units under the control of the horizontal scanning circuit 60. The signal processing unit 70 calculates a difference between the S-data and the N-data sent from the column memory 54, and calculates an optical signal from which noise components have been removed. When the S-data is based on the high luminance output (J=1), the difference value between the S-data and the N-data is multiplied by four, whereby the signal is restored to a signal of four times corresponding to the gain of the amplifier circuit 44, and then the signal is output.

However, actually, due to a deviation in gain of the amplifier circuit 44, an offset component caused by switching noise of the feedback capacitor, or the like, only by multiplying the data at the time of high-luminance output by four, a step is generated at the boundary with the low-luminance output, and good linearity cannot be obtained. Therefore, in the present embodiment, the correction value acquired as follows is used to reduce the level difference of the luminance at the boundary portion between the pixels 12 of the high luminance output and the pixels 12 of the low luminance output.

Next, a method of correcting a pixel value in the imaging device according to the present embodiment will be described with reference to FIG. 5.

Acquisition of a correction value for correcting a pixel value is performed using a blanking period in which a readout operation is not performed in an image frame. First, the vertical scanning circuit 20 controls the control signal SEL to the L level to turn off the select transistor M4, thereby disconnecting the pixel 12 from the output line 16. Next, the voltage supply circuit 34 of the output line control unit 30 generates a voltage (amplitude with respect to the voltage Vn: $\Delta Vv1a$) lower than the voltage Vn of the output line 16 according to the pixel signal reference voltage by the voltage $\Delta Vv1a$, and inputs the voltage to the output line 16. In this state, the digital value D1 when the gain of the amplifier circuit 44 is one time and the digital value D3 when the gain of the amplifier circuit 44 is four times are acquired in the same manner as the pixel signal readout method described above. The voltage supply circuit 34 of the output line control unit 30 generates a voltage (amplitude with respect to the voltage Vn: $\Delta Vv1b$) lower than the voltage Vn by a voltage $\Delta Vv1b$ ($<\Delta Vv1a$), and inputs the voltage to the output line 16. In this state, the digital value D2 when the gain of the amplifier circuit 44 is one time and the digital value D4 when the gain of the amplifier circuit 44 is four times are acquired in the same manner as the pixel signal readout method described above. FIG. 5 illustrates the relationship between the voltage of the output line 16 and the digital values D1, D2, D3, and D4.

The digital values D1, D2, D3, and D4 thus acquired are transferred to the signal processing unit 70 in the same manner as the S-data and the N-data, and are used for calculating the correction values in the signal processing unit 70. Specifically, the digital values D1, D2, D3, and D4 are used to calculate the correction values $\alpha$ and $\beta$ from the following equations (1) and (2).

$$4\alpha = (D4-D3)/(D2-D1) \quad (1)$$

$$\beta = D3 - 4\alpha \times D1 \quad (2)$$

When the pixel signal of the S-level is a high luminance output (J=1), the digital value DH of the pixel signal after the CDS processing can be calculated using the following equation (3) using the correction values $\alpha$ and $\beta$.

$$DH = 4\alpha(S-N) + \beta \quad (3)$$

The equations (1) to (3) may be rewritten as the following equations (1)' to (3)', where G1 is a gain when the digital values D1 and D3 are acquired, and G2 is a gain when the digital values D2 and D4 are acquired.

$$(G2/G1) \times \alpha = (D4-D3)/(D2-D1) \quad (1)'$$

$$\beta = D3 - (G2/G1) \times \alpha \times D1 \quad (2)'$$

$$DH = (G2/G1) \times \alpha(S-N) + \beta \quad (3)'$$

On the other hand, when the pixel signal of the S-level is a low luminance output (J=0), the digital value DL of the pixel signal after the CDS processing may be calculated using the following equation (4) without using the correction values $\alpha$ and $\beta$.

$$DL = S - N \quad (4)$$

In the equations (3) and (4). S is a digital value read out from the S-memory 54S, and N is a digital value read out from the N-memory 54N.

By performing such correction processing, it is possible to suppress a luminance step occurring at the boundary between the pixels 12 of the high luminance output and the pixels 12 of the low luminance output, and to acquire a high-quality image.

However, when the sample-and-hold circuit 58 is used in order to increase the speed of the readout operation, the N-level signal may be changed due to the influence of the S-level signal of the immediately preceding readout row in reading out the N-level signal. As a result, an error may occur in the subsequent correction processing, and the level difference of the luminance at the boundary between the pixels 12 of the high luminance output and the pixels 12 of the low luminance output may not be effectively reduced.

FIG. 6 and FIG. 7 are timing charts assuming the operation at the signal level of the boundary at which the determination result of the comparator 50 is switched from the low luminance to the high luminance during the luminance determination period. The timing at which the control signal $\phi$PC0R is controlled from the H level to the L level is different between FIG. 6 and FIG. 7.

First, a driving method according to the reference example illustrated in the timing chart of FIG. 6 will be described.

At time t1, the control unit 90 controls the control signal $\phi$PC0R from the L level to the H level, and turns on the switch SW3. Thereby, the amplifier circuit 44 is reset. The level of the signal Vcamp-out output from the amplifier circuit 44 falls from the S-level of the last readout row to the reset level.

At a subsequent time t4, the control unit 90 controls the control signal $\phi$PC0R from the H level to the L level, and turns off the switch SW3. Thus, the reset state of the amplifier circuit 44 is released.

The subsequent period from time t5 to time 7 is a sampling period of the N-level signal output to the output line 16. During the period from time t5 to time t7, the control unit 90 controls the control signal $\phi$PSH from the L level to the H level, and turns on the switch SW5. Thus, the amplifier circuit 44 starts to accumulate the N-level signal amplified with a gain of 4 times in the capacitor Csh, and the voltage Vsh of the capacitor Csh gradually drops from the S-level of the immediately preceding readout row toward the reset level (N-level).

However, since the charge of the capacitor Csh does not have a discharge path, the voltage Vsh of the capacitor Csh is unlikely to drop, and it takes time to settle. Therefore, it cannot be sufficiently settled at time t7 at the end of sampling, and a voltage larger than the original N-level by $\Delta Vn$ is held in the capacitor Csh.

The subsequent period from time 12 to time t14 is a period during which AD conversion is performed on the pixel signal of the N-level corresponding to the pixel signal reference voltage. Since the level of the N-level signal held in the capacitor Csh is larger than the original level by $\Delta Vn$, the digital value of the converted N-level signal becomes (N1+Δn). Here, N1 is a digital value corresponding to the original N-level signal, and is a value including the offset of the reference signal VRAMP set during the reset period of the comparator 50. Further, Δn is a digital value error corresponding to ΔVn. The digital value N of the N-level signal is held in the N-memory 54N.

The period from time t16 to time t20 is the luminance determination period of the pixel signal. In FIG. 6, since it is assumed that the amount of incident light is light of a level that forms a boundary between low luminance and high luminance, if it is determined that low luminance (J=0), the column amplifier gain remains four times (×4). When it is determined that the luminance is high (J=1), the value is switched to 1 (×1), and the amplitude of the signal Vcamp-out is reduced to ¼ times. At this time, only the amplitude of the signal Vcamp-out corresponding to the light output of the pixel 12 decreases by ¼. Since the N-level is the reset level, the N-level does not decrease irrespective of the gain of the amplifier circuit 44.

The subsequent period from time t23 to time t25 is a period during which AD conversion is performed on the pixel signal of the S-level. Assuming that the digital conversion value corresponding to the output amplitude of the amplifier circuit 44 when it is determined to be low luminance is S1, the digital value of the S-level at the time of low luminance determination (J=0) is (S1+N1). The digital value of the S-level at the time of high luminance determination (J=1) is (S1/4+N1). The digital value S of the S-level signal is held in the S-memory 54S.

The digital pixel signals held in the S-memory 54S and the N-memory 54N are subjected to correction processing in the signal processing unit 70.

The digital value $D_L$ of the pixel signal after the CDS processing at the time of the low luminance determination (J=0) may be calculated by using the above-described equation (4) as follows.

$$D_L = S - N \quad (4)$$
$$= S1 + N1 - (N1 + \Delta n)$$
$$= S1 - \Delta n$$

Further, the digital value $D_H$ of the pixel signal after the CDS processing at the time of the high luminance determination (J=1) may be calculated by using the above-described equation (3) as follows.

$$D_H = 4\alpha(S - N) + \beta \quad (3)$$
$$= 4\alpha(S1/4 + N1 - (N1 + \Delta n)) + \beta$$
$$= \alpha \times S1 - 4\alpha \times \Delta n + \beta$$

Therefore, if the correction processing using the correction values α and β is not performed (α=1 and β=0), a level difference of luminance corresponding to −3Δn is generated at the boundary between the low luminance and the high luminance. As a result, the linearity at the boundary between the low luminance and the high luminance is deteriorated, and the image quality is deteriorated.

Further, since the level of the voltage Vsh at time t5 is determined by a level settled from the S-level of the immediately preceding readout row, ΔVn changes depending on the magnitude of the S-level in the immediately preceding readout row and the presence or absence of the gain switching operation, and the level difference amount at the boundary between the low luminance and the high luminance also changes. Since the correction processing based on the correction values α and β described with reference to FIG. 5 is performed uniformly for all the rows, the correction processing cannot improve the image quality.

Next, a driving method according to the present embodiment illustrated in the timing chart of FIG. 7 will be described.

In the timing chart of FIG. 7, the timing at which the control signal φPC0R is controlled from the H level to the L level is changed. That is, in the operation example of FIG. 6, after the control signal φPC0R transits from the H level to the L level at time t4, the control signal φPSH transits from the L level to the H level at time 5. On the other hand, in the operation example of FIG. 7, the control signal φPC0R is controlled from the H level to the L level at time t4' after time 15 at which the control signal φPSH transitions to the H level.

By shifting the timing of transition of the control signal φPC0R to the L level backward from the timing of transition of the control signal φPSH to the H level, both the control signals φPC0R and φPSH become the H level during the period from time t5 to time t4'.

During the period from time t5 to time t4', since the control signals φPC0R and φPSH are at the H level, the switches SW3 and SW5 are turned on, and the input node of the amplifier 46 is connected to the capacitor Csh. As a result, the potential of the input node of the amplifier 46 rises, the potential of the inverted amplified output node drops, and the charge of the capacitor Csh passes through the amplifier 46 and is discharged in a short period of time. As a result, the voltage Vsh of the capacitor Csh may be quickly settled to the N-level.

Since the voltage Vsh may be settled to the N-level at the end of sampling at time t7, ΔVn becomes substantially 0, and the digital value error Δn of the N-level caused by ΔVn hardly occurs. Accordingly, it is possible to reduce the level difference of the luminance at the boundary between the low luminance and the high luminance and acquire a favorable image.

As described above, according to the present embodiment, in the imaging device that switches the gain of the amplifier circuit for each pixel in accordance with the amount of incident light, a high-quality image may be acquired without decreasing the readout speed.

Second Embodiment

Figure 8:
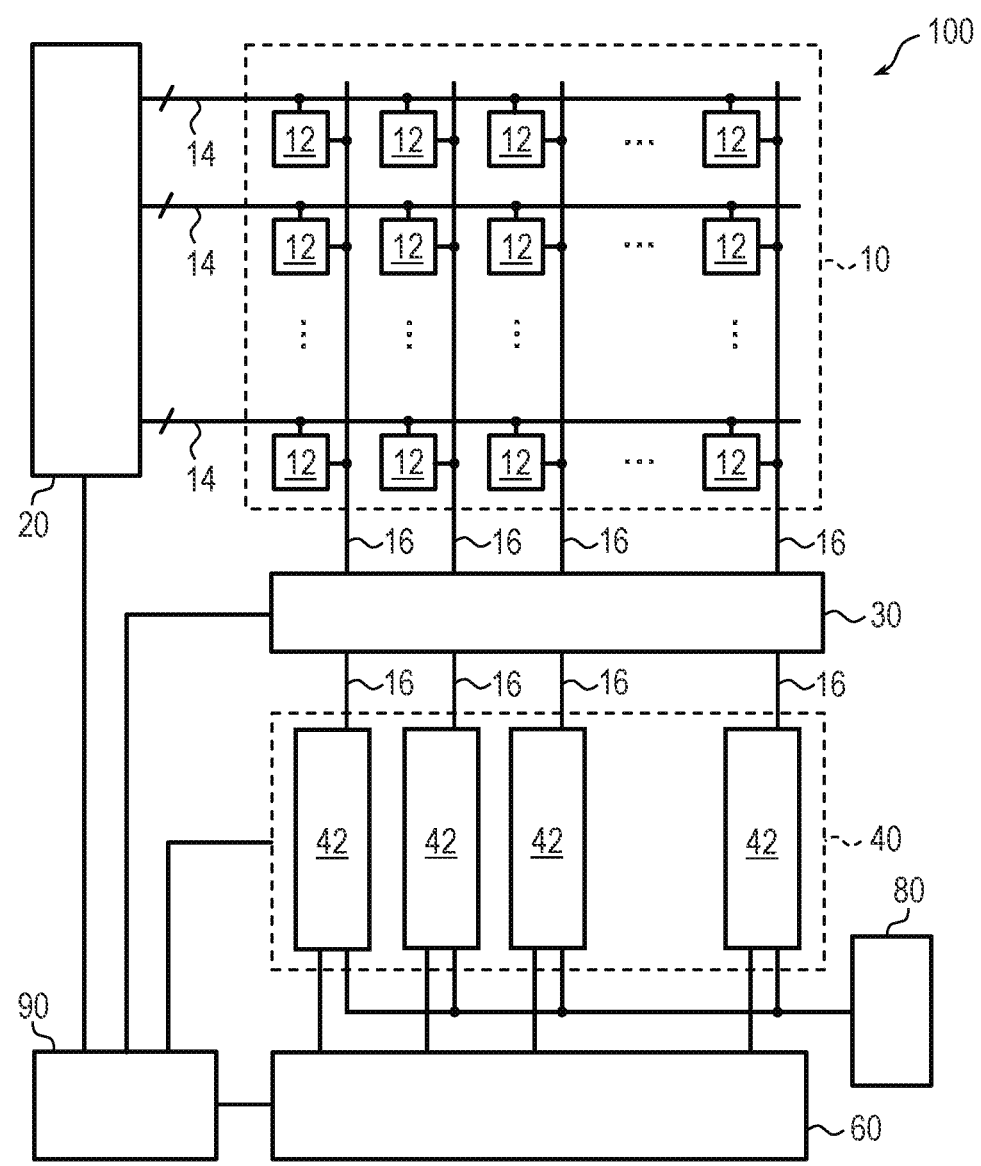
FIG. 8 is a block diagram illustrating a configuration example of an imaging device according to a second embodiment of the present invention.
Figure 9:
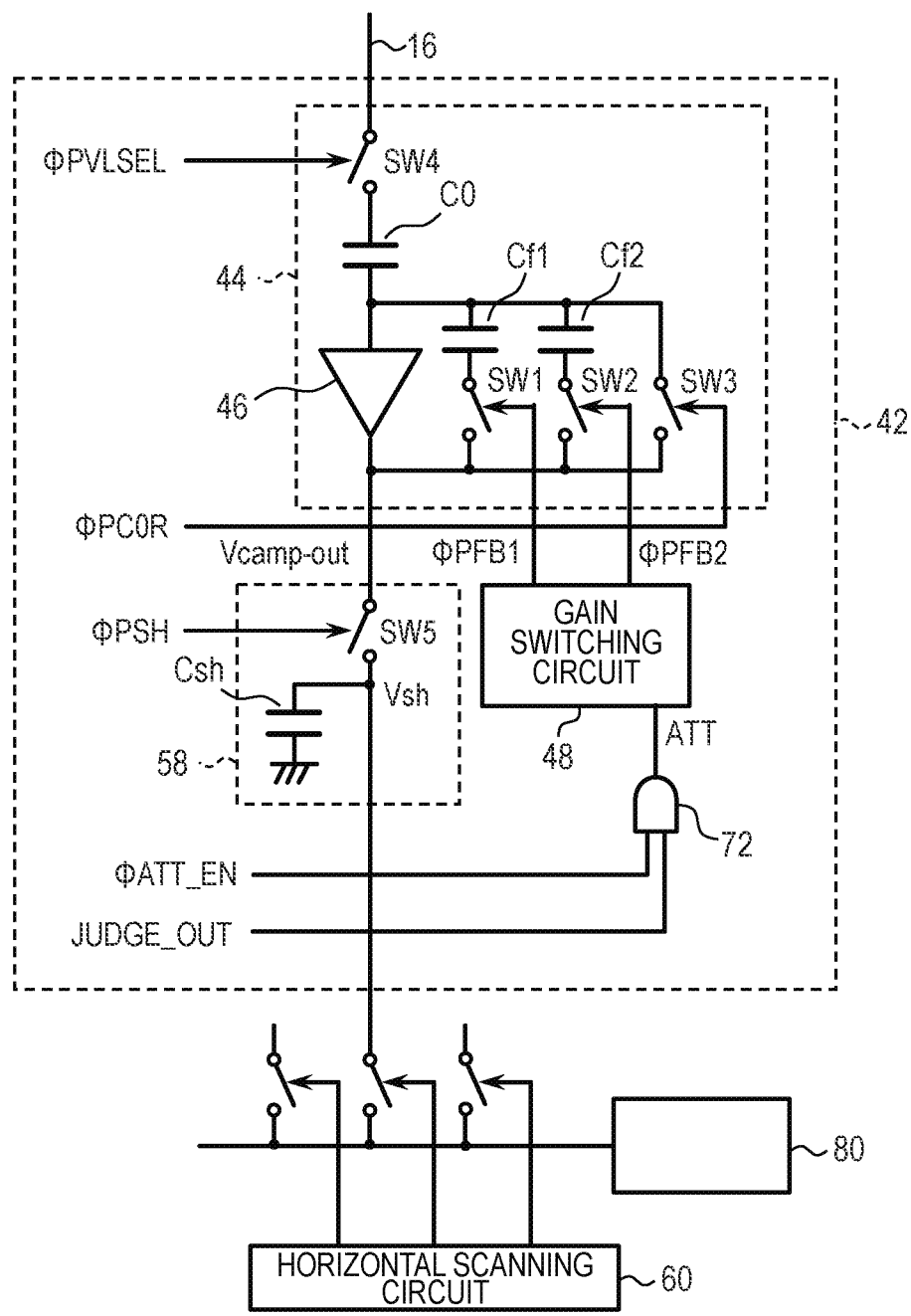
FIG. 9 is a circuit diagram illustrating a configuration example of a column circuit in the imaging device according to the second embodiment of the present invention.

An imaging device and a method of driving the same according to a second embodiment of the present invention will be described with reference to FIG. 8 and FIG. 9. The same components as those of the imaging device according to the first embodiment are denoted by the same reference numerals, and the description thereof will be omitted or simplified. FIG. 8 is a block diagram illustrating a configuration example of an imaging device according to the present embodiment. FIG. 9 is a circuit diagram illustrating a configuration example of a column circuit in the imaging device according to the present embodiment.

The imaging device 100 according to the present embodiment is similar to the imaging device according to the first embodiment except that the AD conversion function is not provided. The analog pixel signal acquired by the pixel 12 is output to the outside of the imaging device 100 via the signal output unit 80 without being subjected to AD conversion. An analog pixel signal output from the imaging device 100 is converted into a digital pixel signal in an external device (for example, a signal processing unit 208 in a fourth embodiment described later).

Since the imaging device 100 according to the present embodiment does not have an AD conversion function, the reference signal generation unit 52 and the counter 56 are not necessary as illustrated in FIG. 8. As illustrated in FIG. 9, the comparator 50 and the column memory 54 are not required in the column circuit 42. The control signal ATT of the gain switching circuit 48 may be generated based on the signal JUDGE_OUT and the control signal ϕATT_EN.

The operation of reading out the pixel signal from the pixel 12 to the sample-and-hold circuit 58 of the column circuit 42 is the same as that of the first embodiment. The horizontal scanning circuit 60 sequentially transfers the pixel signals held by the capacitor Csh of the sample-and-hold circuit 58 to the signal output unit 80 for each column. The transferred pixel signal is output to the outside of the imaging device 100 by the signal output unit 80.

A comparator (not illustrated) provided in the external device compares the pixel signal output from the imaging device 100 with the reference signal. A signal JUDGE_OUT indicating the luminance determination result is input to the imaging device 100, and the gain switching circuit 48 is controlled via the logic gate 72. The luminance determination processing and the AD conversion processing in the external device may be performed in the same manner as the luminance determination processing and the AD conversion processing in the imaging device according to the first embodiment.

As described above, according to the present embodiment, in the imaging device that switches the gain of the amplifier circuit for each pixel in accordance with the amount of incident light, a high-quality image may be acquired without decreasing the readout speed.

Third Embodiment

Figure 10:
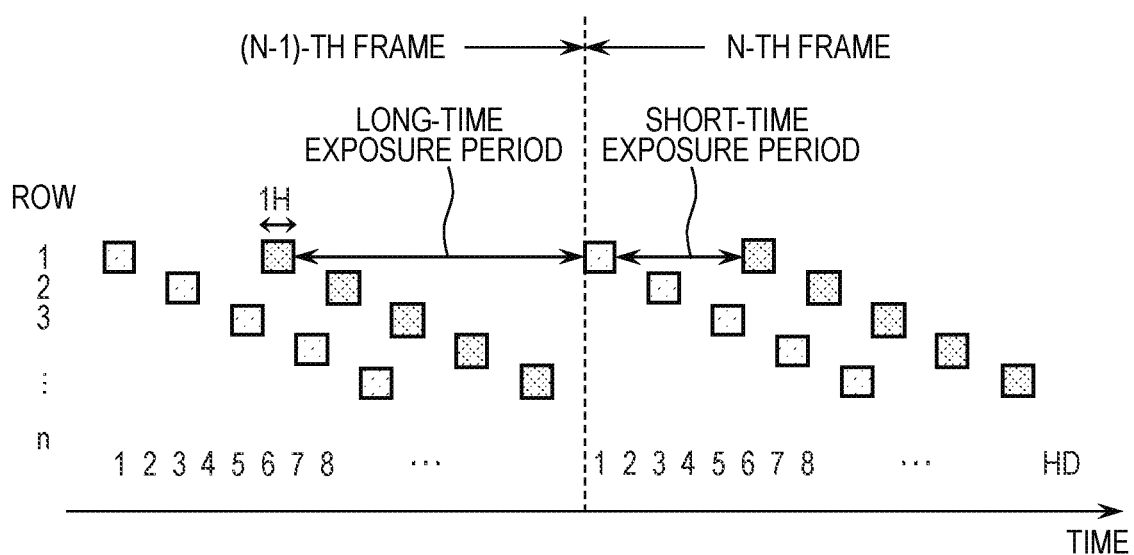
FIG. 10 and FIG. 11 are schematic diagrams illustrating a method of driving an imaging device according to a third embodiment of the present invention.
Figure 11:
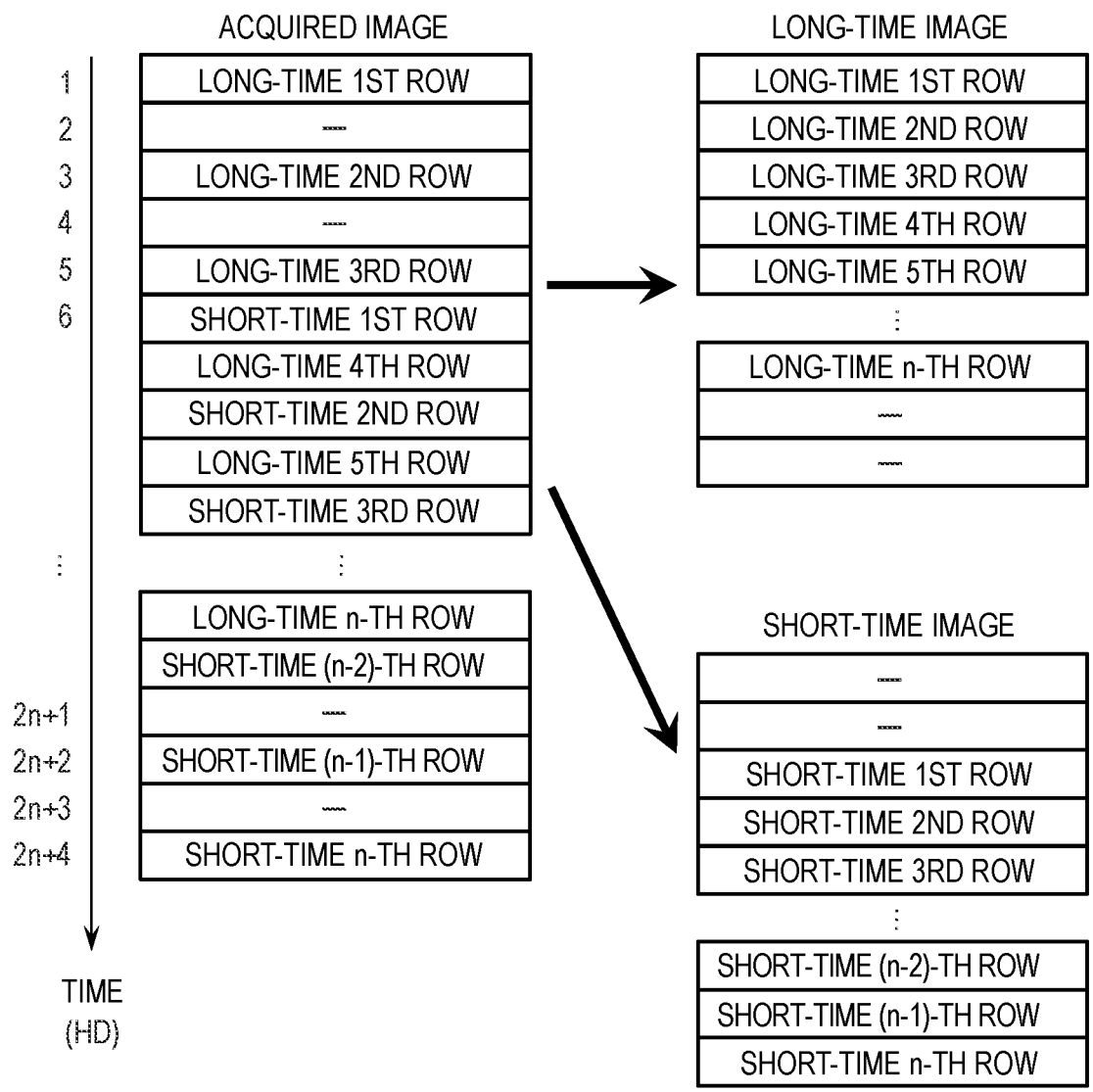
Figure 12:
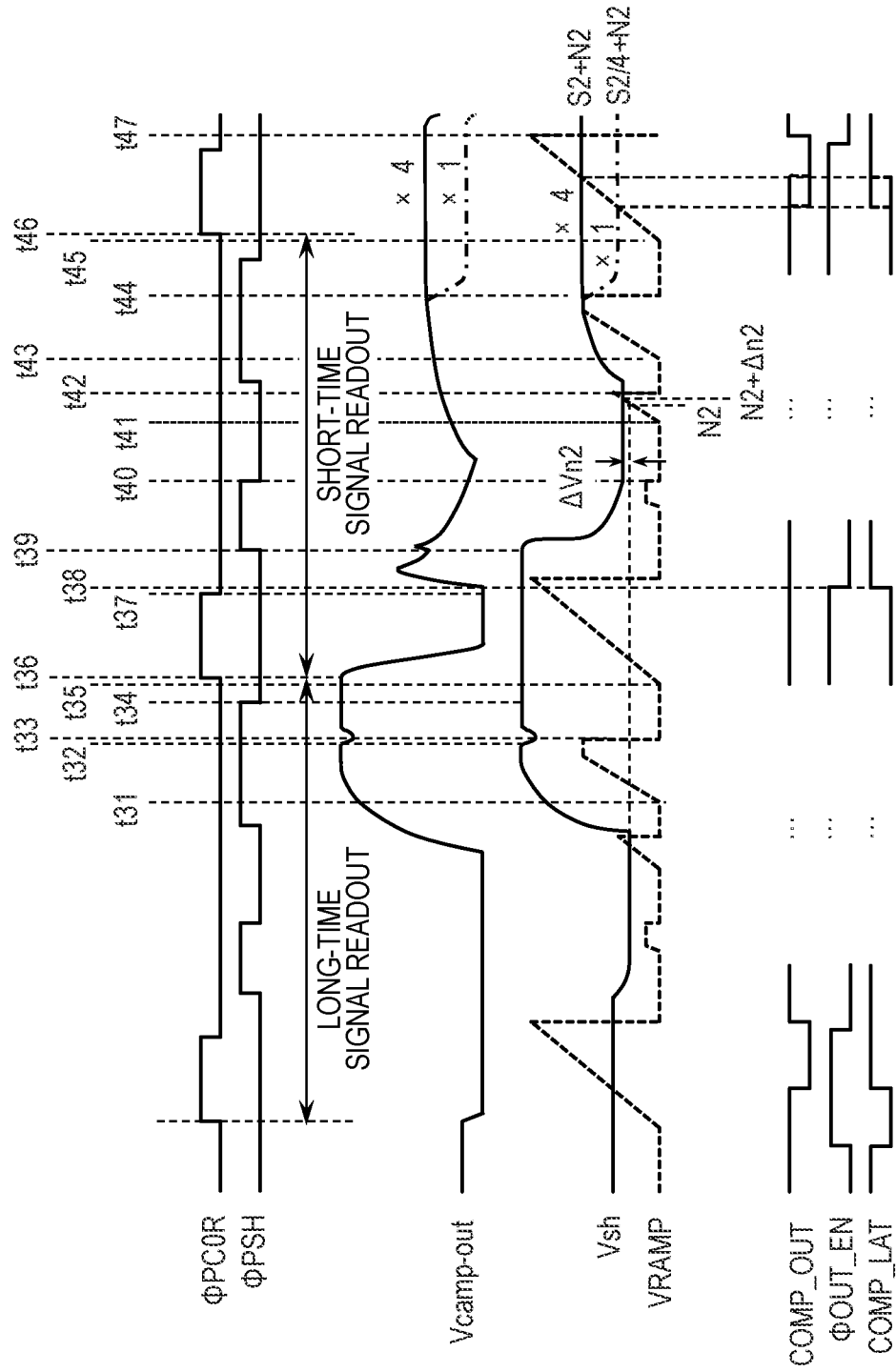
FIG. 12 is a timing chart illustrating a method of driving the imaging device according to the reference example.
Figure 13:
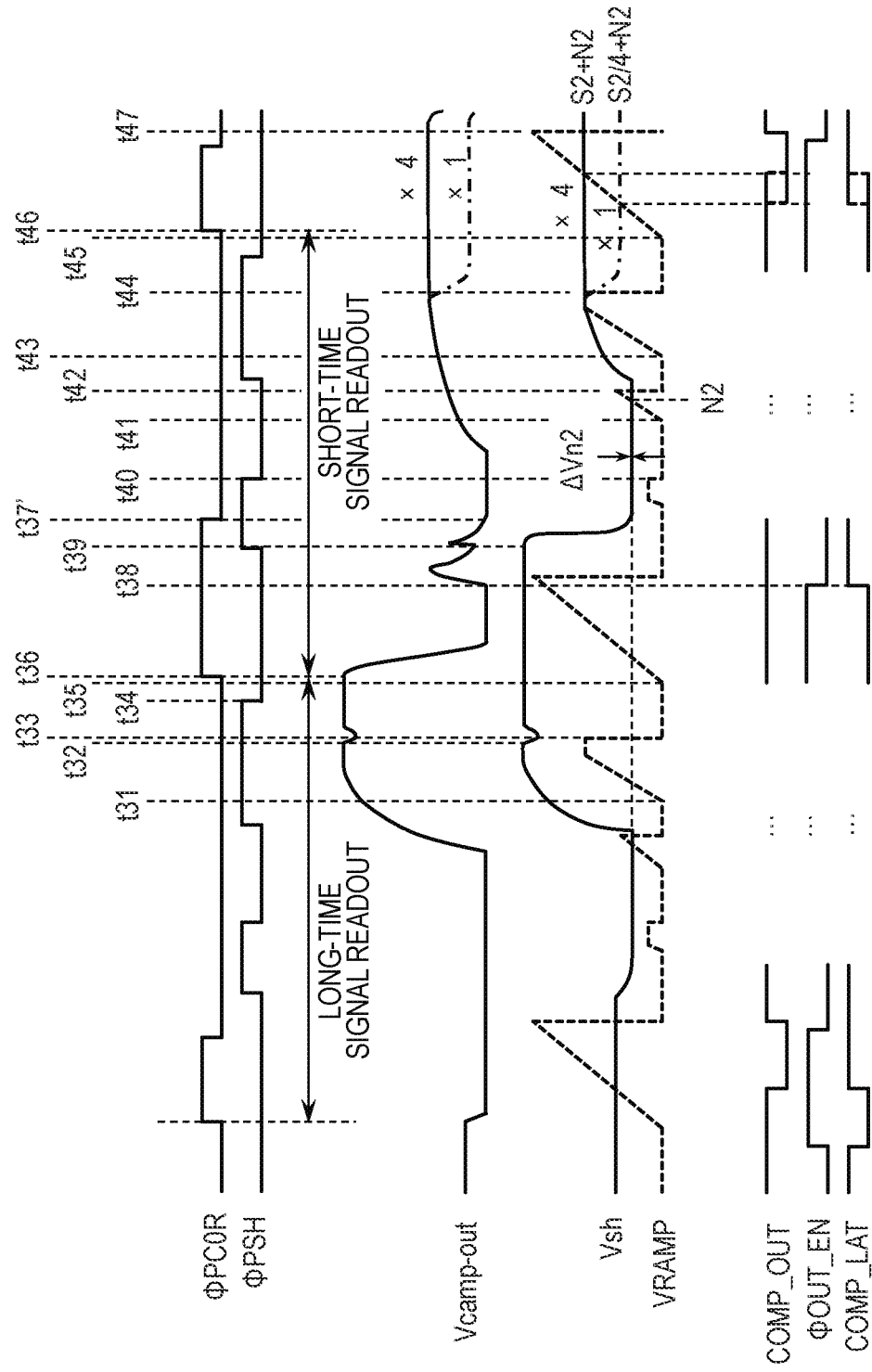
FIG. 13 is a timing chart illustrating a method of driving the imaging device according to the third embodiment of the present invention.

A method of driving an imaging device according to a third embodiment of the present invention will be described with reference to FIG. 10 to FIG. 13. The same components as those of the imaging device according to the first and second embodiments are denoted by the same reference numerals, and the description thereof will be omitted or simplified. FIG. 10 and FIG. 11 are schematic diagrams illustrating a method of driving the imaging device according to the present embodiment. FIG. 12 is a timing chart illustrating a method of driving the imaging device according to the reference example. FIG. 13 is a timing chart illustrating the method of driving the imaging device according to the present embodiment.

In the present embodiment, another method of driving the imaging device according to the first embodiment will be described. That is, in the present embodiment, an operation example in the case where line interleaving driving is performed in which a readout operation of a long-time signal and a readout operation of a short-time signal are alternately performed in a row unit during one frame in the imaging device according to the first embodiment will be described. In the present embodiment, the long-time signal is a signal based on charge generated during a relatively long exposure time (a long-time exposure period), and the short-time signal is a signal based on charge generated during a relatively short exposure time (a short-time exposure period). By compositing an image based on the long-time signal and an image based on the short-time signal, an image having a wide dynamic range may be obtained.

FIG. 10 schematically illustrates the operation of two frames, i.e., the (N−1)-th frame and the N-th frame. The vertical axis represents a row number, and the horizontal axis represents time (horizontal period HD). Each of the rectangular blocks represents a readout operation of pixel signals for one row. A block with a coarse dot pattern is a period during which a readout operation of a long-time signal is performed, and a block with a fine dot pattern is a period during which a readout operation of a short-time signal is performed. Immediately after the readout operation, the next exposure period starts. This is a so-called slit rolling operation, and the timing of the exposure period is different for each row.

The long-time signal of the pixel 12 on the first row based on the charge generated during the long-time exposure period indicated by an arrow in FIG. 10 is read out to the first HD period of the beginning of the N-th frame. In the pixels 12 on the first row, the short-time exposure period is started immediately after the readout operation of the long-time signal is finished. In parallel with the short-time exposure period in the pixels 12 on the first row, the readout of the long-time signals from the pixels 12 on the second and subsequent rows are sequentially performed. However, since the short-time exposure period is short, the readout timing of the short-time signal of the pixel 12 in the first row arrives before the readout operation of the long-time signal ends up to the last row. Therefore, the readout operation of the long-time signal is performed every other HD period, and the readout operation of the short-time signal is performed in the gap. In the example of FIG. 10, the long-time signals of the pixels 12 on the second row are read out at the third HD period, the long-time signals of the pixels 12 on the third row are read out at the fifth HD period, and the short-time signals of the pixels 12 on the first row are read out at the sixth HD period. After the sixth HD period, the long-time signals and the short-time signals are alternately read out row by row.

The resulting image (acquired image) is a mosaic image in which a long-time signals and a short-time signals appear for each HD period, as illustrated on the left side of FIG. 11. The acquired image obtained in this way is divided into a long-time image based on the long-time signals and a short-time image based on the short-time signals in the signal processing unit 70 in the subsequent stage, as illustrated on the right side of FIG. 11.

By the above operation, a period shorter than the period during which all the rows are read out may be set as the short-time exposure period. By compositing the long-time image and the short-time image thus obtained, an image in a wide dynamic range may be acquired.

However, if the driving of FIG. 10 is performed using the sample-and-hold circuit 58 in order to increase the speed of the imaging device 100, the N-level signal of the short-time exposure may not be read out correctly depending on the luminance level of the pixel 12. As a result, a level difference in luminance occurs at the boundary between the low luminance and the high luminance, and the image quality may deteriorate. The reason why the reading out of the N-level signal in the short-time exposure cannot be correctly performed is the power supply fluctuation accompanying the AD conversion operation when the S-level signal in the long-time exposure before 1 HD is read out.

FIG. 12 and FIG. 13 are timing charts assuming the operation at the signal level of the boundary at which the determination result of the comparator 50 is switched from the low luminance to the high luminance during the luminance determination period. In FIG. 12 and FIG. 13, the level of incident light reaching the level of the boundary between the low luminance and the high luminance in the exposure amount of the short-time exposure period is assumed. Therefore, the S-level of the long-time signal is completely saturated. The timing at which the control signal ϕPC0R is controlled from the H level to the L level is different between FIG. 12 and FIG. 13.

First, a driving method according to the reference example illustrated in the timing chart of FIG. 12 will be described.

A period from time t31 to time t33 is a luminance determination period (long-time JUDGE) for the S-level signal of the long-time exposure. Since the output of the amplifier circuit 44 is saturated with respect to the S-level signal of the long-time exposure, the S-level signal of the long-time exposure is determined to have a high luminance, and the gain of the amplifier circuit 44 decreases from four times to one time at time t32. However, since the exposure amount in the long-time exposure period is sufficiently large, the output of the amplifier circuit 44 is saturated even when the gain becomes one, and the voltage Vsh held by the capacitor Csh at time t34 is also at the saturation level.

A period from time t35 to time t38 is a period in which AD conversion is performed on the S-level signal of the long-time exposure (long-time S-conversion). Since the voltage Vsh is at the saturation level, the voltage Vsh and the reference signal VRAMP are in a relationship (Vsh>VRAMP) during this period, and the signal COMP_OUT remains at the H level. Therefore, when the control signal ϕOUT_EN transits from the H level to the L level at time t38, the signal COMP_LAT transits from the L level to the H level. The signal COMP_LAT is input to the column memory 54, and the count value indicated by the count signal CNT is written to the S-memory 54S. Since this operation occurs at the same timing in all the columns, the power supply voltage supplied to the comparator 50 and the column memory 54 greatly fluctuates.

During the period from the time t36 to the time t37, the control signal PC0R is controlled from the L level to the H level, and the signal Vcamp-out output from the amplifier circuit 44 is settled at the N-level. However, since the amplifier circuit 44 shares a power supply with the comparator 50 and the column memory 54, the signal Vcamp-out output from the amplifier circuit 44 greatly fluctuates due to the influence of the voltage fluctuation caused by the simultaneous operation of the signal COMP_LAT at time t38.

The subsequent period from time t39 to time t40 is the sampling period of the N-level signal of the short-time exposure. Although the amplifier circuit 44 tries to settle the signal Vcamp-out to the original N-level after being influenced by the power supply fluctuation, it takes time to settle the signal since there is no path for discharging charges. Therefore, the signal Vcamp-out cannot be fully settled at time t40, and the voltage Vsh held by the capacitor Csh becomes higher than the original N-level by ΔVn2.

The subsequent period from time t41 to time t42 is a period in which AD conversion is performed on the N-level signal of the short-time exposure (a short-time N-conversion). Since the level of the N-level signal held in the capacitor Csh is larger than the original level by ΔVn2, the digital value of the converted N-level signal becomes (N2+Δn2). Here, N2 is a digital value corresponding to the original N-level signal, and is a value including the offset of the reference signal VRAMP set during the reset period of the comparator 50. Further, Δn2 is a digital value error corresponding to ΔVn2. The digital value N of the N-level signal is held in the N-memory 54N.

A period from time t43 to time t44 is a luminance determination period (a short-time JUDGE) for the S-level signal of the short-time exposure. In FIG. 11, since the exposure amount of the short-time exposure is assumed to be light at a level at the boundary between the low luminance and the high luminance, if it is determined that the luminance is low (J=0), the column amplifier gain remains four times (×4). When it is determined that the luminance is high (J=1), the value is switched to 1 (×1), and the amplitude of the signal Vcamp-out is reduced to ¼ times. At this time, only the amplitude of the signal Vcamp-out corresponding to the light output of the pixel 12 decreases by ¼. Since the N-level is the reset level, the N-level does not decrease irrespective of the gain of the amplifier circuit 44.

The subsequent period from time t45 to time t46 is a period in which AD conversion is performed on the S-level signal of the short-time exposure (short-time S-conversion). Assuming that the digital conversion value corresponding to the output amplitude of the amplifier circuit 44 when the short-time exposure signal is determined to be low luminance is S2, the digital value of the S-level at the time of low luminance determination (J=0) is (S2+N2). The digital value of the S-level at the time of high luminance determination (J=1) is (S2/4+N2). The digital value S of the S-level signal is held in the S-memory 54S.

The digital pixel signals held in the S-memory 54S and the N-memory 54N are subjected to correction processing in the signal processing unit 70.

The digital value $D_L$ of the pixel signal after the CDS processing at the time of the low luminance determination (J=0) may be calculated by using the above-described equation (4) as follows.

$$D_L = S - N \qquad (4)$$
$$= S2 + N2 - (21 + \Delta n2)$$
$$= S2 - \Delta n2$$

Further, the digital value $D_H$ of the pixel signal after the CDS processing at the time of the high luminance determination (J=1) may be calculated by using the above-described equation (3) as follows.

$$D_H = 4\alpha(S - N) + \beta \qquad (3)$$
$$= 4\alpha(S2/4 + N2 - (N2 + \Delta n2)) + \beta$$
$$= \alpha \times S2 - 4\alpha \times \Delta n2 + \beta$$

Therefore, assuming that the correction processing based on the correction values α and β is not performed (α=1 and β=0), a luminance step corresponding to −3×Δn2 is generated at the boundary between the low luminance and the high luminance. As a result, the linearity at the boundary between the low luminance and the high luminance of the short-time image is deteriorated, and the image quality is deteriorated.

In addition, since the row of the long-time exposure which is read out in the horizontal period immediately before the short-time readout is different from the row of the short-time readout, there are a row in which ΔVn2 in FIG. 12 occurs and a row in which ΔVn2 does not occur. Further, even if the exposure time of the short-time exposure is changed, the immediately preceding long-time exposure row is changed, so that the row in which ΔVn2 is generated is switched. Since the correction processing based on the correction values α and β described with reference to FIG. 5 is performed uniformly for all the rows, the correction processing cannot improve the correction processing.

Next, a driving method according to the present embodiment illustrated in the timing chart of FIG. 13 will be described.

In the timing chart of FIG. 13, the timing at which the control signal φPC0R is controlled from the H level to the L level is changed. That is, in the operation example of FIG. 12, after the control signal φPC0R transits from the H level to the L level at time t37, the control signal φPSH transits from the L level to the H level at time 39. On the other hand, in the operation example of FIG. 13, the control signal φPC0R is controlled from the H level to the L level at time t37' after time t39 at which the control signal PSH transitions to the H level.

When the timing at which the control signal φPC0R transitions from the H level to the L level is shifted to the rear of the time t38, the amplifier circuit 44 is in the reset state when a fluctuation of the power supply voltage occurs due to the simultaneous operation of the signal COMP_LAT generated at the time t38. Thus, the output of the amplifier circuit 44 may be rapidly set to the reset level.

Further, in the operation example of FIG. 13, the control signal φPC0R transitions from the H level to the L level at time t37' after time t39 at which the control signal φPSH transitions to the H level. Thus, as described in the first embodiment, the voltage Vsh of the capacitor Csh may be quickly settled from the S-level to the N-level of the immediately preceding read out row.

Since the voltage Vsh may be set to the N-level at the end of sampling at time t40, ΔVn becomes substantially 0, and the digital value error Δn of the N-level caused by ΔVn hardly occurs. Accordingly, it is possible to reduce the level difference of the luminance at the boundary between the low luminance and the high luminance and acquire a favorable image.

As described above, according to the present embodiment, in the imaging device that switches the gain of the amplifier circuit for each pixel in accordance with the amount of incident light, a high-quality image may be acquired without decreasing the readout speed.

Fourth Embodiment

Figure 14:
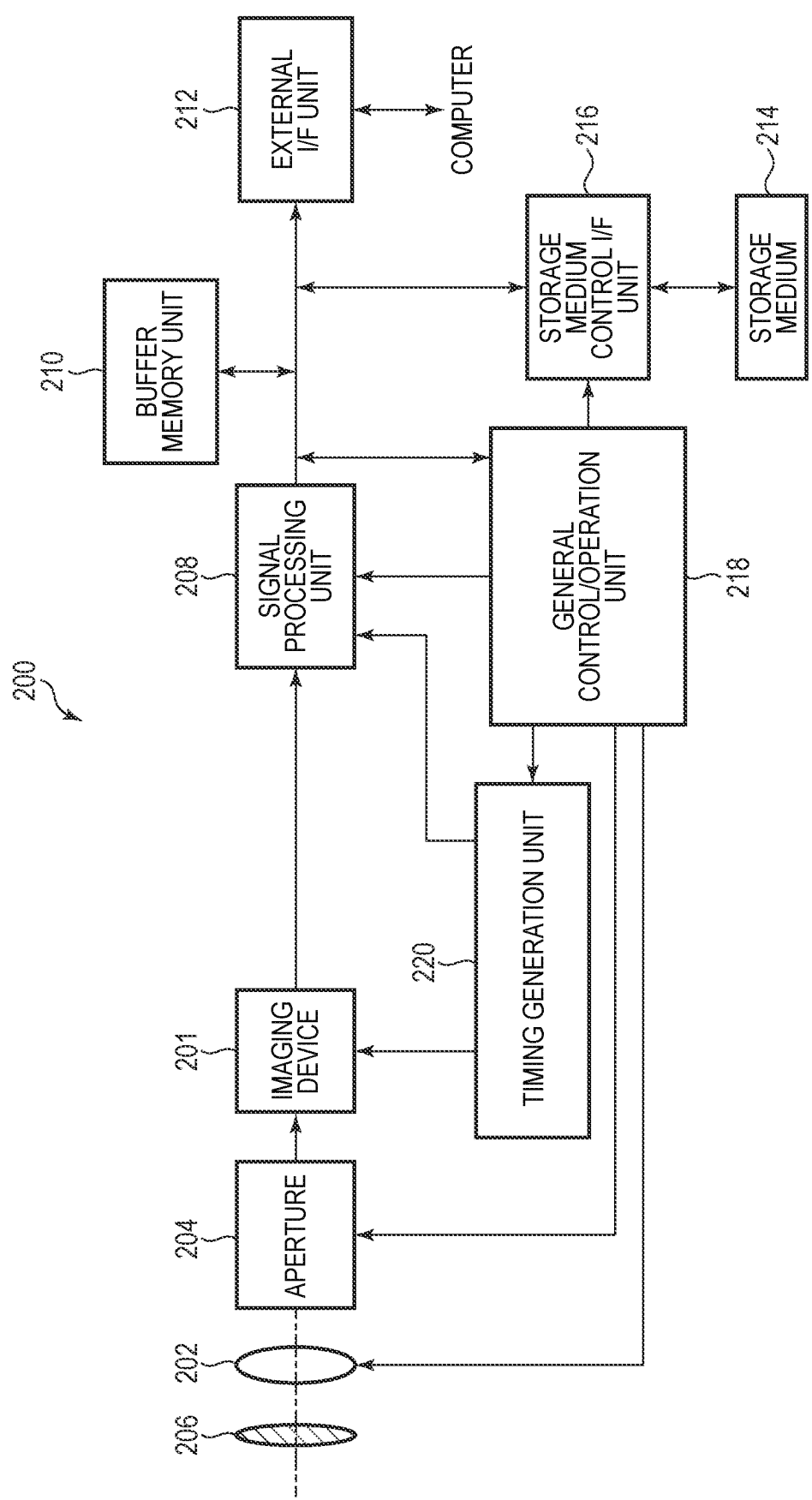
FIG. 14 is a block diagram illustrating a schematic configuration of an imaging system according to a fourth embodiment of the present invention.

An imaging system according to a fourth embodiment of the present invention will be described with reference to FIG. 14. FIG. 14 is a block diagram illustrating a schematic configuration of an imaging system according to the present embodiment.

The imaging device 100 described in any one of the first to third embodiments is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 14 is a block diagram of a digital still camera.

The imaging system 200 illustrated in FIG. 14 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 are optical systems for focusing light on the imaging device 201. The imaging device 201 is the imaging device 100 described in any one of the first to third embodiments, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a buffer memory unit 210 for temporarily storing image data, and an external interface unit (external I/F unit) 212 for communicating with an external computer or the like. The imaging system 200 further includes a storage medium 214 such as a semiconductor memory for storing or reading out imaging data, and a storage medium control interface unit (storage medium control I/F unit) 216 for storing or reading out imaging data on or from the storage medium 214. The storage medium 214 may be built in the imaging system 200 or may be detachable.

The imaging system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on an imaging signal output from the imaging device 201, and outputs image data. The signal processing unit 208 generates an image using the imaging signal.

As described above, according to the present embodiment, the imaging system to which the imaging device 100 according to any one of the first to third embodiments is applied may be realized.

Fifth Embodiment

Figure 15A:
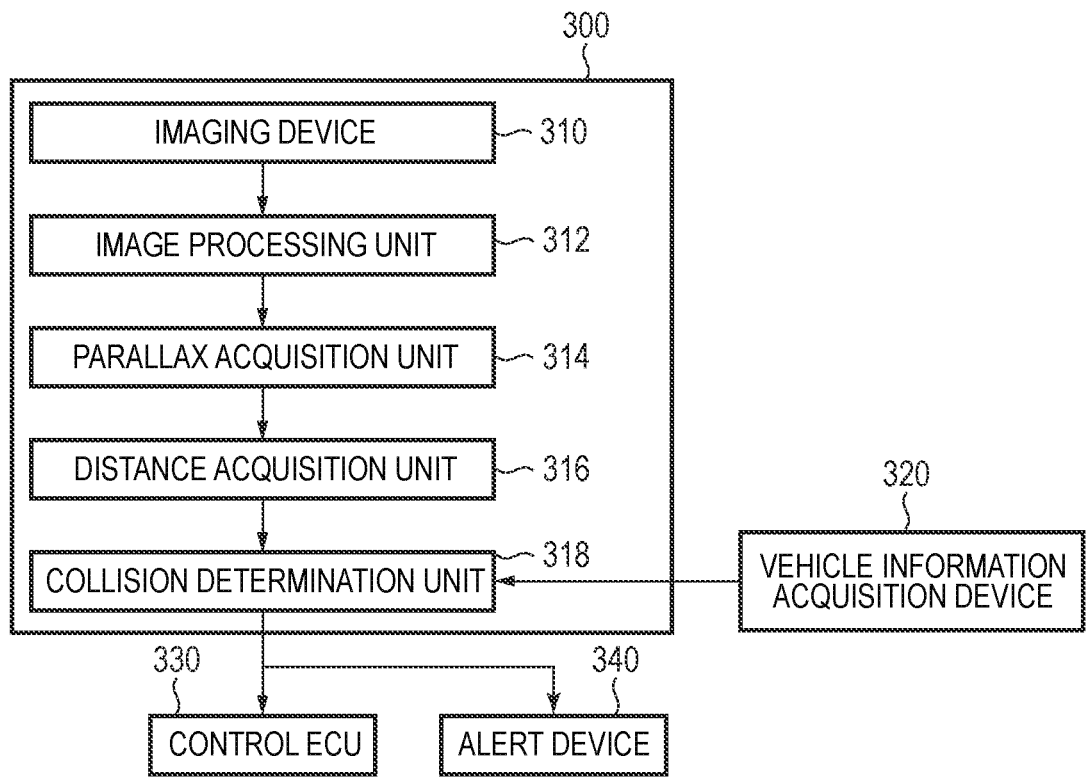
FIG. 15A is a diagram illustrating a configuration example of an imaging system according to a fifth embodiment of the present invention.
Figure 15B:
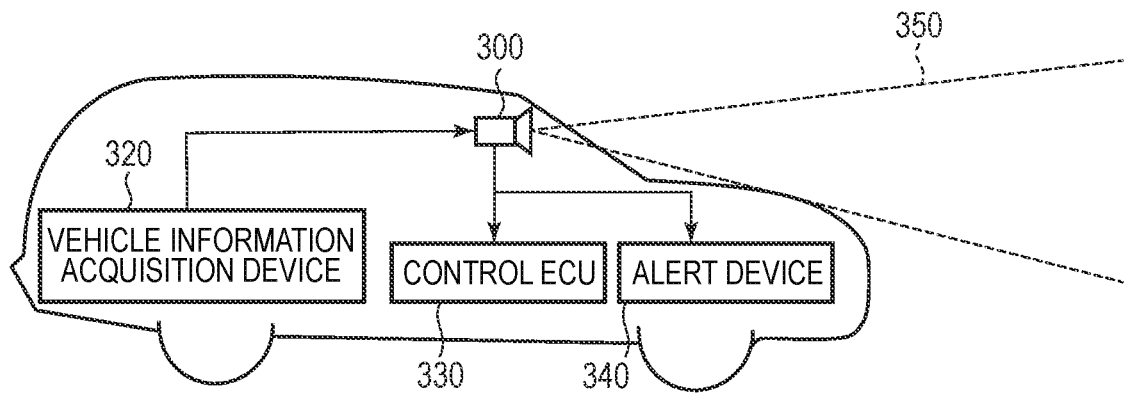
FIG. 15B is a diagram illustrating a configuration example of a movable object according to the fifth embodiment of the present invention.

An imaging system and a movable object according to a fifth embodiment of the present invention will be described with reference to FIG. 15A and FIG. 15B. FIG. 15A is a diagram illustrating a configuration of an imaging system according to the present embodiment. FIG. 15B is a diagram illustrating a configuration of a movable object according to the present embodiment.

FIG. 15A illustrates an example of an imaging system related to an in-vehicle camera. The imaging system 300 includes an imaging device 310. The imaging device 310 is the imaging device 100 described in any one of the first to third embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to the object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition unit may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle, and the like. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alarm to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alarm information on a screen of a car navigation system or the like, and provides a warning to the user by applying vibration to a seatbelt or steering.

In the present embodiment, an image of the periphery of the vehicle, for example, the front or the rear is captured by the imaging system 300. FIG. 15B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the present invention is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (movable device) such as a ship, an aircraft, or an industrial robot. In addition, the present invention may be applied not only to a movable object but also to an apparatus using object recognition in a wide range such as an advanced road traffic system (ITS).

Modified Embodiments

The present invention is not limited to the above embodiments, and various modifications are possible.

For example, an example in which a configuration of a part of any embodiment is added to another embodiment or an example in which a configuration of apart of another embodiment is substituted is also an embodiment of the present invention.

The circuit configuration of the pixel 12 illustrated in FIG. 2 is an example, and may be changed as appropriate. For example, a pixel configuration in which a charge holding portion is further provided separately from the floating diffusion FD and a global electronic shutter operation may be performed may be employed.

In the first to third embodiments, the gain of the amplifier circuit 44 for amplifying the pixel signal is one or four times. Further, the gain of the amplifier circuit 44 is not necessarily two types, and for example, three or more types of pixel signals, such as low luminance, medium luminance, and high luminance, may be determined and amplified by gains corresponding to them.

Further, in the first to third embodiments, the correction processing is performed on the digital values transferred from the column memory 54 to the signal processing unit 70 using the correction values α and β, thereby effectively suppressing the level difference in luminance occurring at the boundary between the pixels 12 of the high luminance output and the pixels 12 of the low luminance output. However, even when the operation timing of the switch SW3 and the switch SW5 is set as described above, the effect of reducing the level difference of the luminance occurring at the boundary between the pixel 12 of the high luminance output and the pixel 12 of the low luminance output must be small. Therefore, the correction processing using the correction values α and β is not necessarily performed.

The function of the signal processing unit 70 is not necessarily provided in the imaging device 100, and may be implemented outside the imaging device 100. For example, in the imaging system 200 of the fourth embodiment, at least a part of the functions of the signal processing unit 70 may be provided in the signal processing unit 208. The amplifier circuit 44 may include a luminance determination circuit. In any of the embodiments, the same effects as those described in the above embodiments can be achieved.

In the first to third embodiments, an apparatus intended to acquire an image, i.e., an imaging device is exemplified, but the application example of the present invention is not necessarily limited to the imaging device. For example, in the case where the present invention is applied to an apparatus mainly targeted for distance measurement as described in the fifth embodiment, it is not always necessary to output an image. In such a case, the device can be said to be a photoelectric conversion device that converts optical information into a predetermined electric signal. The imaging device is one of photoelectric conversion devices.

The imaging system described in the fourth or fifth embodiment is an example of an imaging system to which the photoelectric conversion device of the present invention may be applied, and the imaging system to which the photoelectric conversion device of the present disclosure may be applied is not limited to the configurations illustrated in FIG. 14 and FIG. 15A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$m), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-178125, filed Oct. 23, 2020, which is hereby incorporated by reference herein in its entirety.

What is claimed is:

1. An imaging device comprising:
a pixel including a photoelectric converter and outputting a pixel signal based on an amount of charge generated by the photoelectric converter;
an output line that the pixel signal is to be output from the pixel;
a readout circuit unit connected to the output line; and
a control unit configured to control the pixel and the readout circuit unit,
wherein the readout circuit unit includes an amplifier circuit, a first switch configured to reset the amplifier circuit, a sample-and-hold circuit, a second switch provided between the amplifier circuit and the sample-and-hold circuit, and a gain switching circuit configured to switch a gain of the amplifier circuit according to a level of the pixel signal,
wherein the control unit is configured to perform
a first period of resetting the amplifier circuit by turning on the first switch, and
a second period of connecting the amplifier circuit and the sample-and-hold circuit by turning on the second switch, and
wherein the first period and the second period at least partially overlap with each other, and a timing at which the second switch transitions from an on state to an off state in the second period is later than a timing at which the first switch transitions from an on state to an off state in the first period.

2. The imaging device according to claim 1,
wherein the control unit is configured to output from the pixel, a first pixel signal based on an amount of charge generated by the photoelectric converter during a first exposure period and a second pixel signal based on an amount of charge generated by the photoelectric converter during a second exposure period shorter than the first exposure period, and
wherein the control unit is configured to perform the first period and the second period in an operation of reading out the second pixel signal.

3. The imaging device according to claim 1,
wherein the readout circuit unit further includes a comparator configured to compare the pixel signal held by the sample-and-hold circuit with a reference signal, and
wherein the gain switching circuit is configured to switch a gain of the amplifier circuit in accordance with a result of comparison by the comparator.

4. The imaging device according to claim 3, wherein the control unit is configured to set the gain of the amplifier circuit to a second gain smaller than a first gain when a level of the pixel signal amplified by the first gain is higher than a level of the reference signal.

5. The imaging device according to claim 4, wherein the readout circuit unit further includes an analog-to-digital conversion circuit including the comparator and configured to perform an analog-to-digital conversion on the pixel signal amplified by the amplifier circuit, and is configured to output a first digital pixel signal based on a reference voltage output from the pixel in a reset state and a second digital pixel signal based on the amplified pixel signal.

6. The imaging device according to claim 5 further comprising a voltage supply circuit configured to supply a constant voltage to the output line,
wherein the control unit is configured to control the readout circuit unit to acquire
a first digital value when amplified by the second gain and a third digital value when amplified by the first gain with supplying to the output line a first voltage having a first amplitude with respect to the reference voltage, and
a second digital value when amplified by the second gain and a fourth digital value when amplified by the first gain with supplying to the output line a second voltage having a second amplitude smaller than the first amplitude with respect to the reference voltage.

7. The imaging device according to claim 6, wherein the first digital value, the second digital value, the third digital value, and the fourth digital value are acquired during a blanking period.

8. The imaging device according to claim 6 further comprising a signal processing unit configured to process a signal output from the readout circuit unit,
wherein the signal processing unit is configured to perform a correction processing on the first digital pixel signal and the second digital pixel signal based on a correction value calculated from the first digital value, the second digital value, the third digital value, and the fourth digital value.

9. The imaging device according to claim 8, wherein the following relationships are satisfied, where G1 is the first gain, G2 is the second gain, D1 is the first digital value, D2 is the second digital value, D3 is the third digital value, D4 is the fourth digital value, and α and β are the correction values:

$$(G2/G1) - \alpha = (D4 - D3)/(D2 - D1), \text{and}$$

$$\beta = D3 - (G2/G1) \times \alpha D1.$$

10. The imaging device according to claim 8, wherein, when the second digital pixel signal is based on a pixel signal amplified by the second gain, a digital value $D_H$ of the digital pixel signal after the correction process is expressed by the following equation, where N is a digital value of the first digital pixel signal, and S is a digital value of the second digital pixel signal:

$$D_H=(G2/G1)\times\alpha(S-N)\beta.$$

11. The imaging device according to claim 8, wherein, when the second digital pixel signal is based on a pixel signal amplified by the first gain, a digital value $D_L$ of a digital pixel signal after the correction process is expressed by the following equation, where N is a digital value of the first digital pixel signal, and S is a digital value of the second digital pixel signal:

$$D_L=S-N.$$

12. The imaging device according to claim 6, wherein a voltage of the output line corresponding to a level of the reference signal is a voltage between the first voltage and the second voltage.

13. The imaging device according to claim 1 comprising a plurality of pixels arranged in a plurality of rows and a plurality of columns,
   wherein the output line is provided corresponding to each of the plurality of columns,
   wherein the readout circuit unit includes a plurality of column circuits provided corresponding to the plurality of columns, and each including the amplifier circuit, the first switch, the sample-and-hold circuit, the second switch, and the gain switching circuit, and
   wherein the control unit is configured to set a gain of the amplifier circuit for the pixel signal of each of the plurality of pixels.

14. The imaging device according to claim 1,
   wherein the pixel further includes a charge holding portion, a third switch configured to transfer charge in the photoelectric converter to the charge holding portion, and an output unit configured to output a pixel signal based on an amount of charge held in the charge holding portion,
   wherein the readout circuit unit further includes a fourth switch provided between the output line and the amplifier circuit, and
   wherein the control unit is configured to, when a pixel signal based on an amount of charge to the output line by turning on the third switch to transfer the charge in the photoelectric converter to the charge holding portion, set the fourth switch to an off state during a period in which the third switch is in an on state and a period until the output unit is settled after the third switch transitions from the on state to an off state.

15. The imaging device according to claim 14, wherein the period until the output unit is settled is a period until a potential of the output line becomes lower than a potential of the output line before the charge is transferred to the charge holding portion.

16. An imaging system comprising:
   the imaging device according to claim 1; and
   a signal processing device configured to process a signal output from the imaging device.

17. A movable object comprising:
   the imaging device according to claim 1;
   a distance information acquiring unit configured to acquire a distance information to an object from a parallax image based on a signal output from the pixel of the imaging device; and
   a control unit configured to control the movable object based on the distance information.

18. A method of driving an imaging device including a pixel including a photoelectric converter and outputting a pixel signal based on an amount of charge generated by the photoelectric converter, an output line that the pixel signal is to be output from the pixel, and a readout circuit unit connected to the output line, wherein the readout circuit unit includes an amplifier circuit, a first switch configured to reset the amplifier circuit, a sample-and-hold circuit, a second switch provided between the amplifier circuit and the sample-and-hold circuit, and a gain switching circuit configured to switch a gain of the amplifier circuit according to a level of the pixel signal, the method comprising:
   performing a first period of resetting the amplifier circuit by turning on the first switch, and
   performing a second period of connecting the amplifier circuit and the sample-and-hold circuit by turning on the second switch,
   wherein the first period and the second period at least partially overlap with each other, and a timing at which the second switch transitions from an on state to an off state in the second period is later than a timing at which the first switch transitions from an on state to an off state in the first period.

* * * * *